(12) United States Patent
Lategan

(10) Patent No.: US 9,049,152 B2
(45) Date of Patent: Jun. 2, 2015

(54) HOTKEY ACCESS TO LEGACY APPLICATION TASKS

(75) Inventor: Christopher F. Lategan, Kirkland, WA (US)

(73) Assignee: Advanced BusinessLink Corporation, Kirkland, WA (US)

(*) Notice: Subject to any disclaimer, the term of this patent is extended or adjusted under 35 U.S.C. 154(b) by 258 days.

(21) Appl. No.: 12/914,850

(22) Filed: Oct. 28, 2010

(65) Prior Publication Data

US 2011/0271221 A1    Nov. 3, 2011

Related U.S. Application Data

(60) Provisional application No. 61/280,034, filed on Oct. 28, 2009, provisional application No. 61/280,044, filed on Oct. 28, 2009, provisional application No. 61/280,040, filed on Oct. 28, 2009, provisional application No. 61/280,060, filed on Oct. 28, 2009, provisional application No. 61/280,042, filed on Oct. 28, 2009, provisional application No. 61/280,041, filed on Oct. 28, 2009, provisional application No. 61/280,043, filed on Oct. 28, 2009.

(51) Int. Cl.
| | |
|---|---|
| *G06F 3/00* | (2006.01) |
| *H04L 12/911* | (2013.01) |
| *G06F 9/44* | (2006.01) |
| *G06F 3/0484* | (2013.01) |
| *H04L 29/08* | (2006.01) |

(52) U.S. Cl.
CPC ........ *H04L 47/70* (2013.01); *G06F 8/70* (2013.01); *G06F 3/0484* (2013.01); *H04L 67/10* (2013.01)

(58) Field of Classification Search
CPC . H04M 1/72533; H04M 1/04; H04M 1/7253; H04M 1/72569; H04M 1/72572; H04M 2250/02; H04M 2250/74; H04M 2250/22; H04M 1/22; H04M 1/72522; H04M 1/72558; H04M 1/72583; H04M 2250/12; G06F 3/0485; G06F 3/0481; G06F 3/0482; G06F 3/04817; G06F 3/0484; G06F 3/04883; G06F 3/017; G06F 1/1626; G06F 1/1632; G06F 2200/1614; G06F 17/3002; G06F 17/30038; G06F 17/30053
USPC .................................................. 715/708, 709
See application file for complete search history.

(56) References Cited

U.S. PATENT DOCUMENTS

| | | |
|---|---|---|
| 6,161,139 A | 12/2000 | Win et al. |
| 6,615,258 B1 | 9/2003 | Barry et al. |

(Continued)

OTHER PUBLICATIONS

William Stanek, Introducing Windows Vista (Jun. 21, 2006).*

(Continued)

*Primary Examiner* — Amy Ng
*Assistant Examiner* — Di Xiao
(74) *Attorney, Agent, or Firm* — Ellen M. Bierman; Lowe Graham Jones PLLC

(57) ABSTRACT

Methods, systems, and techniques for assigning hotkeys to legacy tasks as part of modernizing such tasks are provided. A user can assign a hotkey to an individual task so that the user can have instant access to a legacy or a non-legacy task without needing to navigate to "sub-" tasks of the legacy task. Hotkey access may be used with role-based modernization of legacy tasks to provide navigation to and from legacy tasks without starting and stopping sessions. Example embodiments provide a Role-Based Modernization System ("RBMS"), which uses these enhanced modernization techniques to provide role-based modernization of menu-based legacy applications.

19 Claims, 31 Drawing Sheets
(16 of 31 Drawing Sheet(s) Filed in Color)

(56) References Cited

U.S. PATENT DOCUMENTS

| | | | |
|---|---|---|---|
| 6,762,851 | B1 | 7/2004 | Lynch et al. |
| 6,993,773 | B2 | 1/2006 | Broussard |
| 7,426,642 | B2 | 9/2008 | Aupperle et al. |
| 7,548,979 | B2 | 6/2009 | Hanners et al. |
| 7,765,254 | B2 | 7/2010 | Hariharan et al. |
| 7,832,012 | B2 | 11/2010 | Huddleston |
| 8,171,417 | B2 * | 5/2012 | Bamford et al. ............. 715/763 |
| 2002/0097277 | A1 | 7/2002 | Pitroda |
| 2003/0048296 | A1 | 3/2003 | Cullen et al. |
| 2003/0120709 | A1 | 6/2003 | Pulsipher et al. |
| 2003/0182287 | A1 | 9/2003 | Parlanti |
| 2005/0010651 | A1 | 1/2005 | Xu et al. |
| 2005/0278654 | A1 | 12/2005 | Sims |
| 2005/0278655 | A1 | 12/2005 | Sims |
| 2006/0161889 | A1 * | 7/2006 | Stabb et al. .................... 717/113 |
| 2007/0055943 | A1 | 3/2007 | McCormack et al. |
| 2007/0088707 | A1 | 4/2007 | Durgin et al. |
| 2007/0094372 | A1 * | 4/2007 | Hariharan et al. ............ 709/223 |
| 2007/0260702 | A1 | 11/2007 | Richardson et al. |
| 2008/0034377 | A1 | 2/2008 | Vo et al. |
| 2008/0068406 | A1 * | 3/2008 | Silverbrook et al. ............ 347/2 |
| 2008/0127052 | A1 | 5/2008 | Rostoker |
| 2008/0189646 | A1 | 8/2008 | Bohle |
| 2009/0083658 | A1 * | 3/2009 | Ito et al. ........................ 715/781 |
| 2009/0248397 | A1 | 10/2009 | Garcia et al. |

OTHER PUBLICATIONS

Shimonski, Using Remote Desktop with Windows XP. Professional (Dec. 7, 2004).*

"SSL" Newton's Telecom Dictionary, Mar. 2005, 21st ed., pp. 792.

American Heritage Dictionary, p. 1120. (2nd Ed.). (1982/1991) Boston, MA: Houghton Mifflin Co.

McDaniel, George, (Ed). IBM Dictionary of Computing, pp. 66 and 384-386. International Business Machines Corporation. (1994).

* cited by examiner

```
Strategi by ADVANCED BusinessLink (www.businesslink.com)                    - □ ×
                    Work with Strategi Users                    SEATTLE7

Position To _____

Type options, press Enter.
  2=Change   3=Copy   4=Delete   5=Display   8=Attributes   9=Files   10=Connections
 11=Enable  12=Disable  13=Certificate Wait  14=Groups  15=Zones Opt Access Name                          Number      Class       Status
 _  ANDREW LEW                           000007143   *EXTERNAL   *ENABLED
 _  BANGUU DELLE                         000007142   *EXTERNAL   *ENABLED
 _  BARRY@BUSINESSLINK.COM                000007240   *EXTERNAL   *ENABLED
 _  CHRIS@BUSINESSLINK.COM                000007238   *EXTERNAL   *ENABLED
 _  CLARK.KENT@SUPERHEROS.COM             000007242   *EXTERNAL   *ENABLED
 _  DAVID TRANG                          000007144   *EXTERNAL   *ENABLED
 _  FF@YY.COM                            000007249   *EXTERNAL   *ENABLED
 _  G                                    000007248   *EXTERNAL   *ENABLED
 _  JACK SPARROW                         000007147   *EXTERNAL   *CERTWAIT
 _  KAM LAI                              000007146   *EXTERNAL   *ENABLED
 _  RAHIM SURANI                         000007145   *EXTERNAL   *ENABLED
 _  SCOTT@NOWHERE.COM                    000007247   *EXTERNAL   *ENABLED
                                                                         More....
F3=Exit     F5=Refresh    F6=Create        F10=Sort Number   F11=Next View
F12=Cancel  F13=Repeat    F16=Option Parms F24=More keys
```

Fig. 1B

| Strategi by ADVANCED Businesslink (www.businesslink.com) | _ □ × |
|---|---|
| Work with Strategi Users | SEATTLE7 |

Position To

Type options, press Enter.
  2=Change    3=Copy    4=Delete    5=Display    8=Attributes    9=Files    10=Connections
  11=Enable   12=Disable   13=Certificate Wait   14=Groups   15=Zones

| Opt | Access Name | Number | Class | Status |
|---|---|---|---|---|
| | ANDREW LEW | 000007143 | *EXTERNAL | *ENABLED |
| | BANGUU DELLE | 000007142 | *EXTERNAL | *ENABLED |
| | BARRY@BUSINESSLINK.COM | 000007240 | *EXTERNAL | *ENABLED |
| | CHRIS@BUSINESSLINK.COM | 000007238 | *EXTERNAL | *ENABLED |
| | CLARK.KENT@SUPERHEROS.COM | 000007242 | *EXTERNAL | *ENABLED |
| | DAVID TRANG | 000007144 | *EXTERNAL | *ENABLED |
| | FF@YY.COM | 000007249 | *EXTERNAL | *ENABLED |
| | G | 000007248 | *EXTERNAL | *CERTWAIT |
| | JACK SPARROW | 000007147 | *EXTERNAL | *ENABLED |
| | KAM LAI | 000007146 | *EXTERNAL | *ENABLED |
| | RAHIM SURANI | 000007145 | *EXTERNAL | *ENABLED |
| | SCOTT@NOWHERE.COM | 000007247 | *EXTERNAL | *ENABLED |

More...

F3=Exit   F5=Refresh   F6=Create   F10=Sort Number   F11=Next View
F12=Cancel   F13=Repeat   F16=Option Parms   F24=More keys Macro   <<   >>   Enter

*Fig. 2B*

| | | Role A | Role B | Role C | Role D | Role E | Role F | ... | Role M |
|---|---|---|---|---|---|---|---|---|---|
| Task 1 | Execution spec 1 | x | x | | | | | | x |
| Task 2 | Execution spec 2 | | | x | | | | | | x |
| Task 3 | Execution spec 3 | | | x | | | x | | | x |
| Task 4 | Execution spec 4 | | | | x | x | | | | x |
| ... | ... | | | | | | | | | |
| Task N | Execution spec N | | | | | | | | | x |

*Fig. 7*

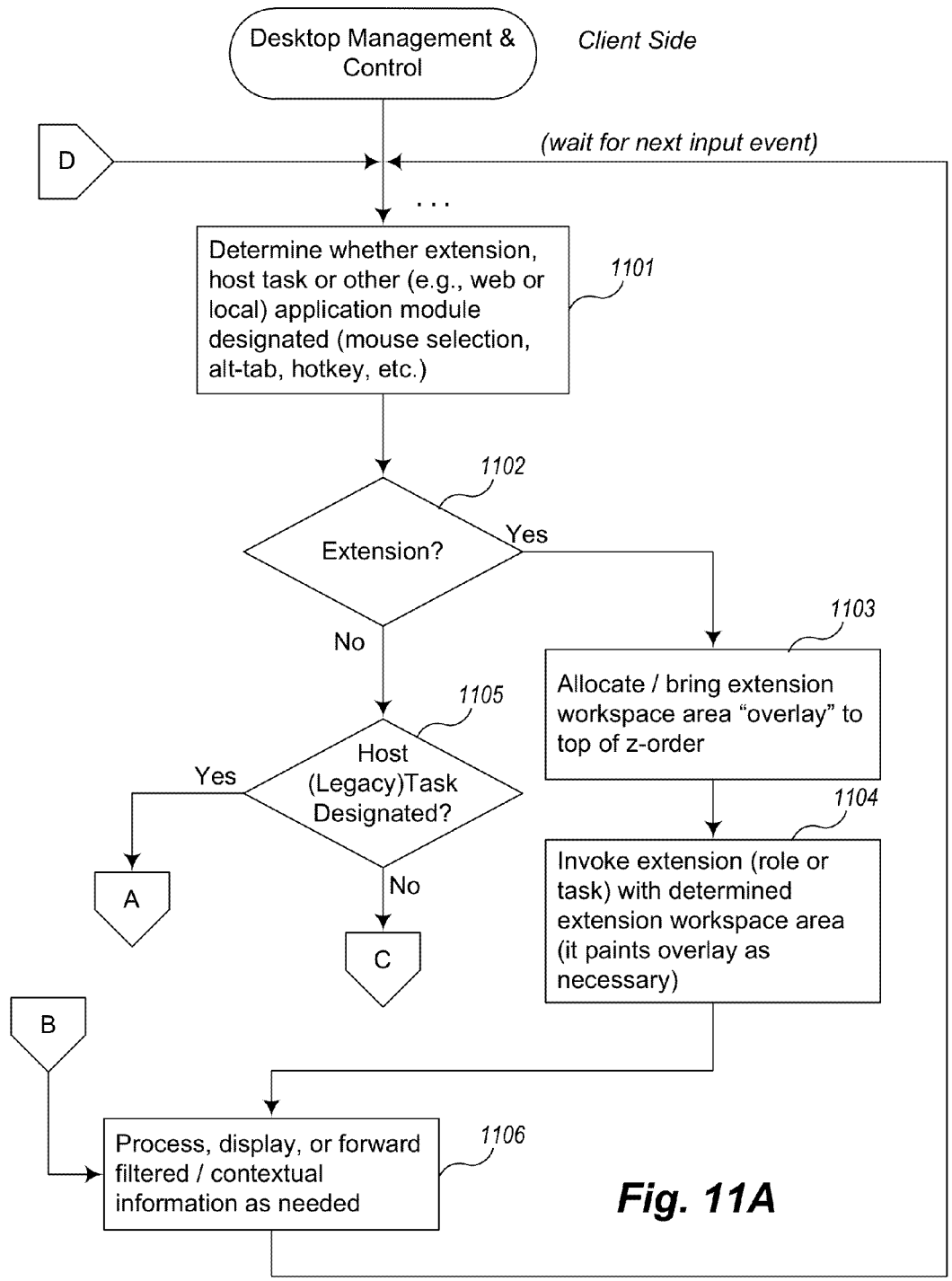

HOTKEY ACCESS TO LEGACY APPLICATION TASKS

TECHNICAL FIELD

The present disclosure relates to methods, systems, and techniques for modernizing menu-based legacy applications and, in particular, to methods, systems, and techniques for providing modernization to legacy applications that includes hotkey access.

BACKGROUND

Traditional computing environments were often populated by mainframe computers such as the IBM 3270, and, eventually, mid-range computers, such as the IBM AS400. Over the years, many companies made huge investments into these platforms, which were notoriously good at providing very large, complex applications, such as accounting, general ledger, and inventory systems for running businesses of all sizes, and vertical applications which were developed to run in optimized form in these host computing environments. Initially, users of such programs used wired terminals to directly communicate via "sessions" with these host environments. A user could create a secure session to communicate with an application running on the host computing system by presenting credentials (e.g., username and log-on information) to the host via the terminal for authentication and authorization. The application would run on the "host" computing system, receive input from the user terminal via a session, and forward output back to the terminal via a session for display. All communication between the terminal and the host computing system was done through sessions. Because the screens of such terminals were traditionally black with green writing, the output from host applications (also referred to as "legacy" applications) were affectionately known as "green screens." FIGS. 1A and 1B are example screen displays of "green screen" legacy application output as presented by such prior systems. There was no direct manipulation or pixel addressing present, the data stream was a typically 80-character stream presented line-by-line on the display screen.

Legacy applications can be typically characterized by their voluminous number of menus, their hierarchical access nature, and their session-driven state. For example, in a legacy application it is quite typical for an end user to select upwards of 10 or more menus, each corresponding to a separately executable task, to get to a point in the system where the user can enter some data, for example in an accounting form, only to need to back all the way out and enter another set of 10 or menus to obtain some related data, for example, a part number of an inventoried item in an inventory system, and then need to reenter all of the first set of 10 or more menus to get back to where the user was originally entering the accounting data. In a single session, this can happen hundreds if not thousands of times. Moreover, to do multiple things at once, for example, to handle the same data entry for multiple customers at a time, each requires a separate session. Thus, it is easy for a user to lose context and become frustrated.

As desktop and personal computing became more mainstream, terminal emulators, designed to run, for example, in windowed environments on a personal computer (PC) and using the Internet, replaced the hard wired terminals. These PCs terminal emulators, emulating the terminals, thus continue to communicate via sessions with the legacy applications running on these host systems. The end user runs each application in a session managed by the terminal emulator, and legacy output is returned to the emulator. The emulator typically presents the green screen equivalent within the confines of the emulator display, often a window. FIGS. 2A and 2B are example screen displays of the same "green screen" legacy application output presented by a terminal emulator.

Overtime, as graphical user interfaces (GUIs) became an expectation, and not just a nicety, increased modernization of the "green screen" was made available. In particular, the interfaces presented by the terminal emulators were made smarter so that some amount of enhanced graphics and visuals could be delivered to interface to these legacy applications. For example, commands could be accessed by checkboxes instead of numeric input, menus could be directly selected, etc. FIGS. 3A and 3B are example screen displays of recent modernization of "green screen" legacy application output as performed in current systems. Even though the user interface is potentially more user-friendly, the underlying host applications still require access through the multitude of menus and via sessions. The protocol remains of sign on, create a session, run one or more jobs, sign off, as many times as needed to accomplish the user's objective.

As a result, although computing resources have become cheaper, and many mid-range computing systems like the AS400 have replaced the old mainframe hardware in many companies, the legacy applications continue to have their strong place in everyday use, especially in larger or geographically distributed companies, such as companies with many branch offices. This phenomenon is due in a large part to the investment that has been made over the years to greatly expand the capabilities of such applications and to tailor the applications for a particular company's use. Customizations may take hundreds of thousands of person-hours and such applications are typically rewritten, regenerated, and redistributed each time a new function or customization is needed. Thus, in instances in which companies have invested large amounts of money and resources, it may make more business sense to continue to run the legacy application rather than convert to another, more modern, tool. Often times it is both cost and time prohibitive to do so.

BRIEF DESCRIPTION OF THE DRAWINGS

The patent or application file contains at least one drawing executed in color. Copies of this patent or patent application publication with color drawings will be provided by the Office upon request and payment of any necessary fee.

FIGS. 1A and 1B are example screen displays of "green screen" legacy application output as used in prior systems.

FIGS. 2A and 2B are example screen displays of the same "green screen" legacy application output presented by a terminal emulator.

FIG. 7 is an example block diagram of an example data structure for storing role-based task associations for implementing role-based modernization of legacy applications.

FIGS. 11A-11C are example flow diagrams of example logic used by a desktop management and control module of an example Role-Based Modernization System.

DETAILED DESCRIPTION

Embodiments described herein provide enhanced computer- and network-based methods, systems, and techniques for modernizing legacy applications, particularly in midrange or mainframe host computing environments. For the purpose of this description, legacy applications/tasks will refer to applications/tasks that run on host computing systems through sessions, regardless of their longevity. Example embodiments provide a Role-Based Modernization System ("RBMS"), which enables the reorganization of menu-based applications by role as a method of legacy application modernization and enables user access to such modernized applications through one or more roles. In addition, and as a result of these modernization techniques, the RBMS supports the ability to enhance such legacy applications by blending them with non-legacy tasks and functions in a user-transparent fashion. According to such modernization techniques, legacy and non-legacy tasks are presented to users in a uniform fashion, regardless of their disparate sources, such that they can be manipulated using the same familiar GUI mechanisms. The end user invokes the application tasks without being exposed to sessions or the voluminous and detailed menu structure, and context is maintained between the tasks as the end user navigates between them, just as if the legacy tasks were applications running in windows in a windowing system. In addition, legacy tasks that have been activated (e.g., caused to run on the host) remain so, such that the user can logout of the system, only to return later, login, and have the active tasks still active providing they are tasks that don't terminate for some other reason.

Figure 1A:
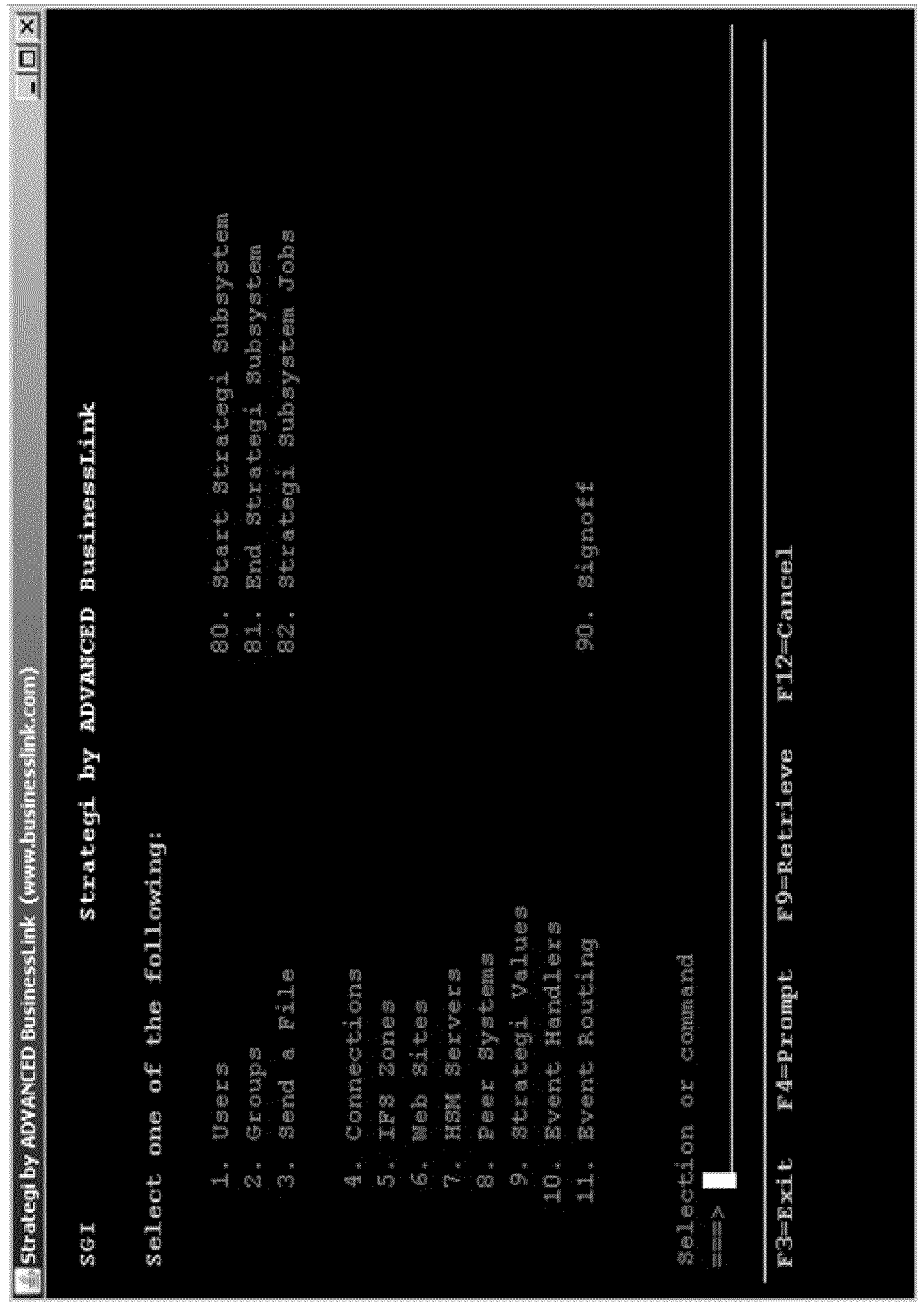
Figure 2A:
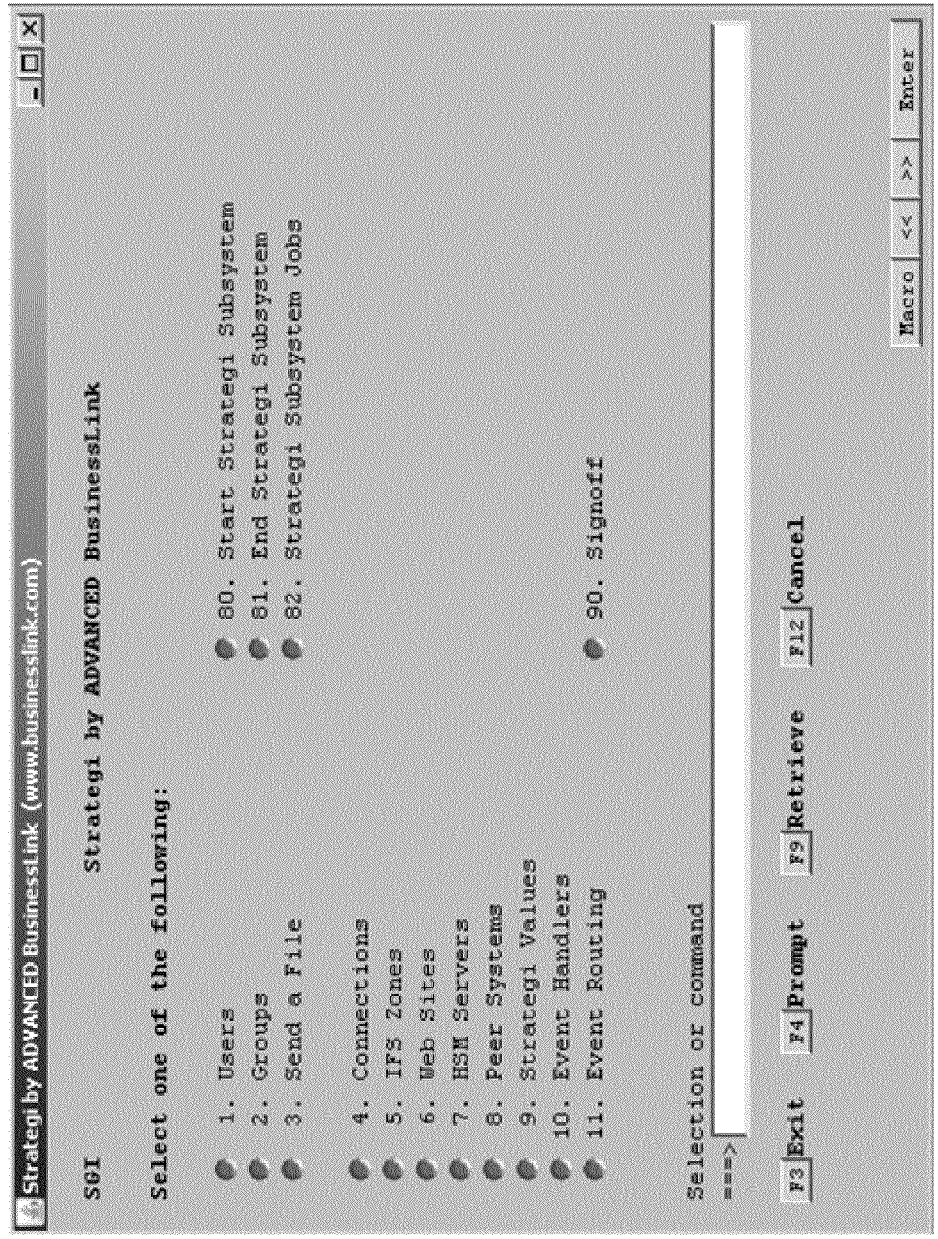
Figure 3A:
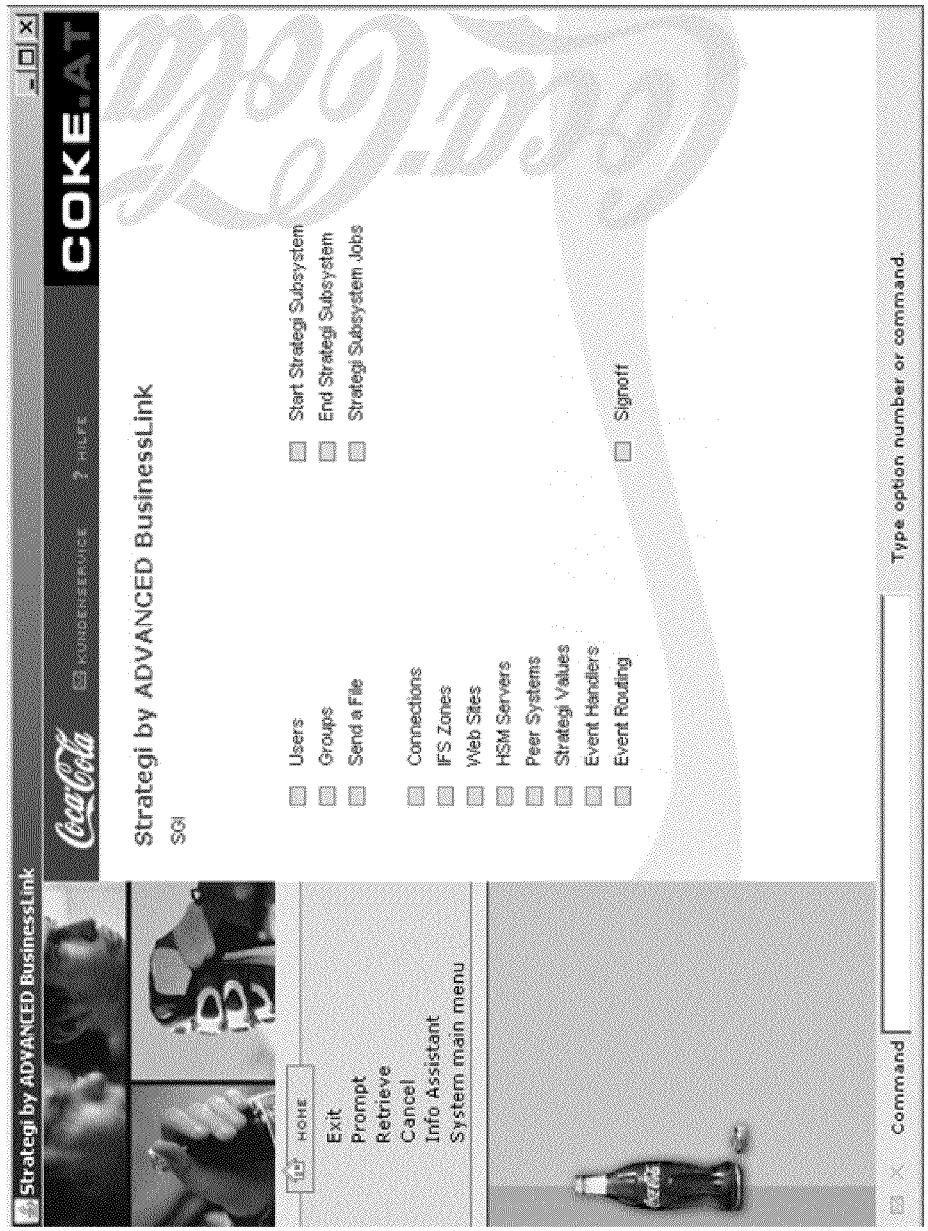
FIGS. 3A and 3B are example screen displays of more recent modernization of "green screen" legacy application output as performed in prior systems.
Figure 3B:
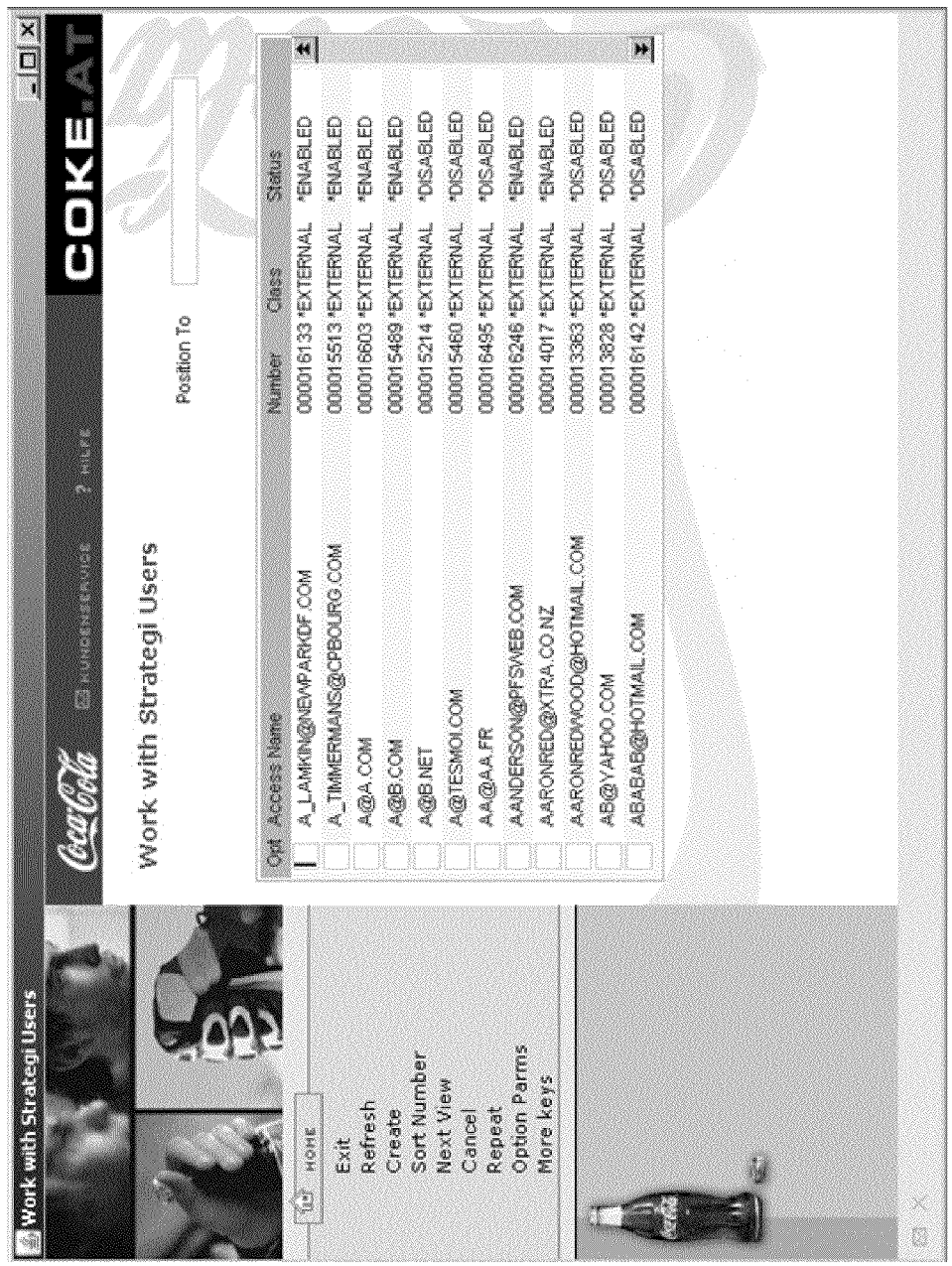
Figure 4:
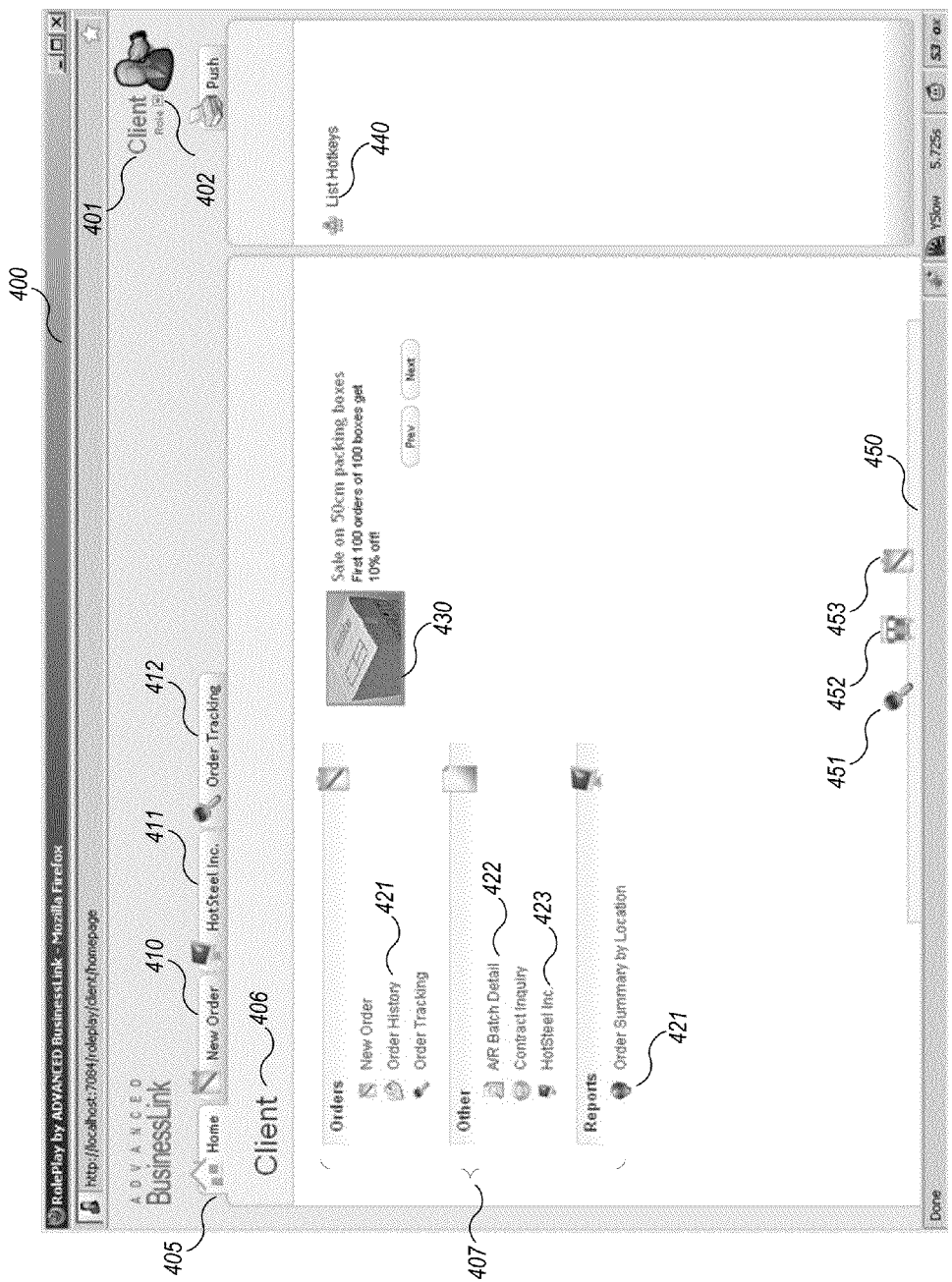
FIG. 4 is an example screen display of role-based modernization of a legacy application.

FIG. 4 is an example screen display of an example role-based modernization of a legacy application. In FIG. 4, display area 400 displays a modernized application in an example RBMS environment called "RolePlay." An indication of the current role is shown as indicator 401. The current role can be changed by selecting user interface control 402. A task workspace area 405 displays whichever task has been selected by the user to work on. Here, task workspace area 405 currently displays the home "desktop" area for the current role "client" 406. Tabs 410-412 indicate tasks that the user has already started (from the desktop) - active tasks. These tasks may include both legacy application tasks, such as "New Order" and "Order Tracking" and non-legacy application tasks such as a webpage for "HotSteel, Inc". The user can switch between each of these tasks at will by a variety of input mechanisms, including, for example, direct selection using a mouse or other similar input device or a hotkey, function key, favorites icon, etc. The possible tasks that have been configured for the user to use in the "client" role 406 are shown in task list 407. Tasks, such as "NR Batch Detail" can be invoked by selecting indicator (e.g., hyperlink) 422, which will result in another tab dynamically displayed along with tabs 410-412. A user with configuration privileges, such as an administrator or other user with abilities to configure roles (e.g., a roles administrator), can configure the tasks that are available for user selection in the client role. In the example shown, icons such as icon 421 are dynamically added to the task list 407 by the RBMS. In addition, the "client" role 406 has been extended to display a data feed 430, which appears on the home desktop of the "client" role each time a user navigates to that home desktop. The favorites dock 450 provides a location for the user to add indicators for quick access to tasks. In the example shown, indicators 451-453 enable quick access to Order Tracking, Delivery Tracking (not shown), and New Order, respectively. Hotkey list 440 provides a list of hotkeys that the user has defined for quick access to a (legacy or non-legacy) task.

Figure 5:
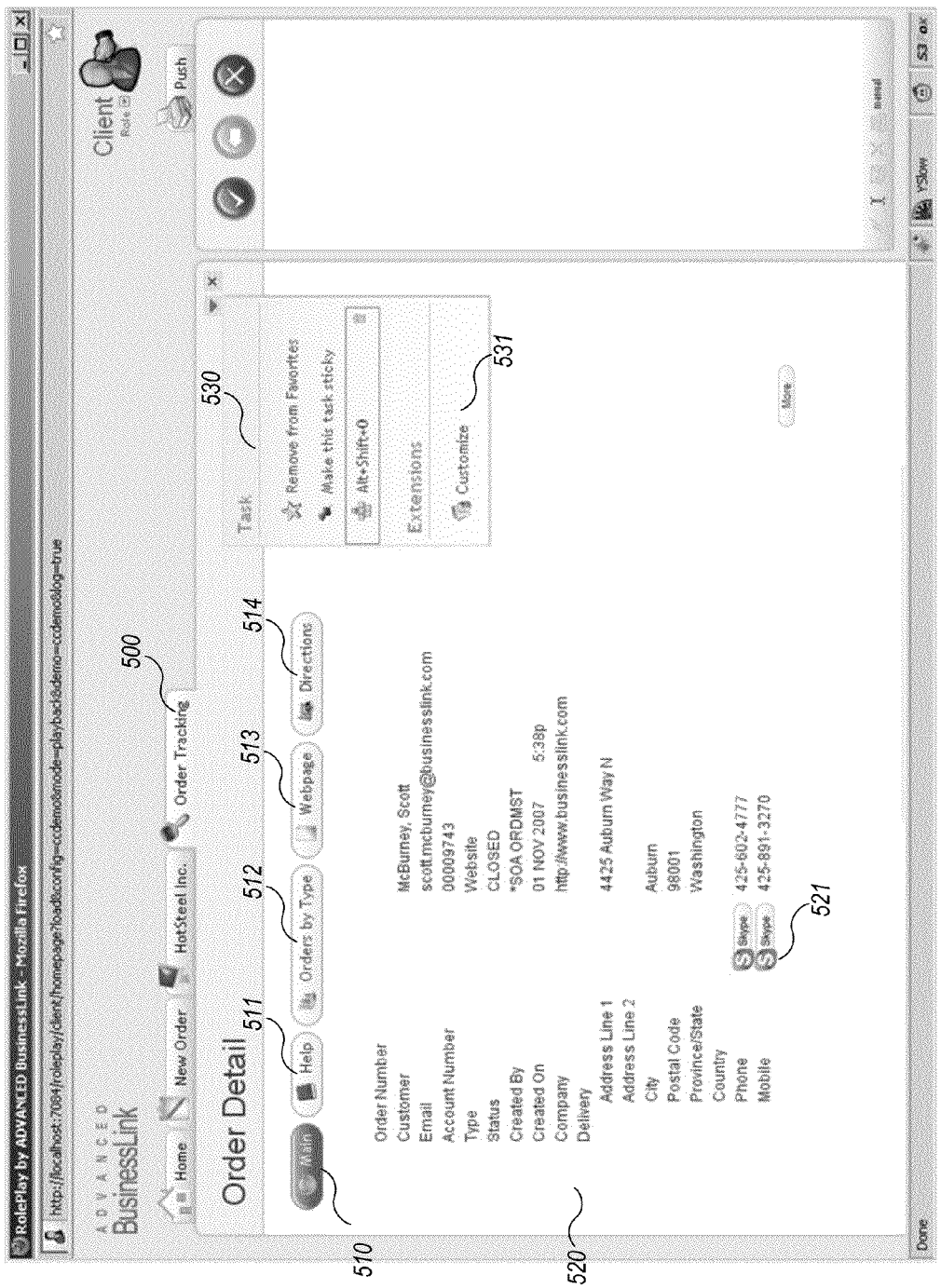
FIG. 5 is an example screen display of a legacy task modernized according to techniques described herein.

For example, when the user selects the Order Tracking favorites icon 451, the Order Tracking task (referred to by tab 412) is brought to the foreground. FIG. 5 is an example screen display of a selected legacy task modernized according to techniques described herein. In particular, FIG. 5 is an example screen display of the Order Tracking task shown after a particular order has been selected. Tab 500 shows that the current selected task for the Client role is "Order Tracking." The "Main" button 510 indicates that this is the main display of the running Order Tracking task. User interface controls 511-514 are task extensions that have been configured, for example by the end user, to imbue the legacy task with added behavior without any programming necessary. In an example embodiment, the user can configure task extensions for roles for which the user has authorization to the extent a user with administrator privileges (an administrator) has defined. Each task extension is associated with a rule for when the extension is presented. In some cases, upon the host generating certain types of content, task extensions may be automatically presented. In general, the RMBS automatically and dynamically causes an extension to be presented when the eligibility criteria expressed by the associated rule has been met. Task workspace area 520 displays the output of the currently executing task (here, information on a selected order). The output is filtered so that other GUI modernizations can be added, such as a link 521 to a telecommunications application (e.g., Skype) when a phone number is detected in the task output, or a link to a mapping program when an address is detected in the task output. A user interface control such as pull-down menu 530 is presented to configure the task. In particular, a user can configure such things as removing an indicator to the task from the favorites dock, making the task always run and appear, defining a hotkey to access the task in one user input action, and customizing by adding, deleting, or modifying available task extensions.

A user can assign a hotkey to an individual task so that the user can have instant access to a legacy or a non-legacy task without needing to access "sub-" tasks of the legacy task (e.g., without navigating through a hierarchy). For example, an end user may wish to associate a hotkey with a particular order, for example, if the user finds a need to look at that particular order screen a lot. These user-assigned hotkeys may be used with role-based modernization of legacy tasks to provide navigation to and from legacy tasks without starting and stopping sessions. The user can navigate between tasks using different hotkeys. The tasks continue to run, and the task associated with the selected hotkey is made the "current" (forefront) task displayed in the task workspace area.

Figure 18:
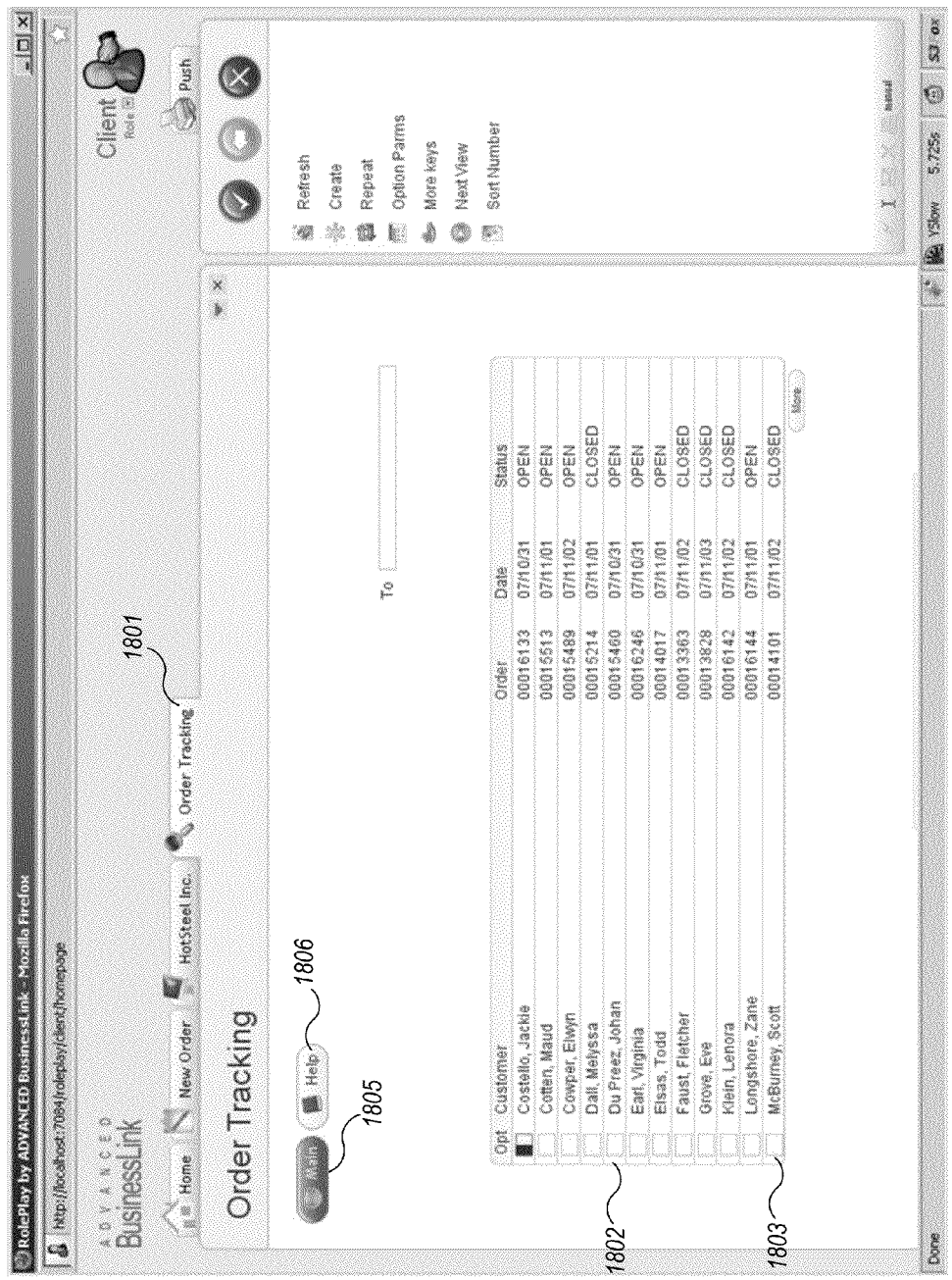
FIG. 18 is an example screen display of an Order Tracking task screen used to access an Order Detail task screen.

FIG. 18 is an example screen display of an Order Tracking task screen used to access an Order Detail task screen. The Order Tracking task workspace area 1801 indicates that it is displaying a home display of a legacy task, with its "main" button 1805 highlighted. One additional extension task is available: the "help" task, which is accessible through the "help" button 1806. The main display of the task workspace area 1801 shows a list of orders by customer, with 1802 and 1803 indicating example individual orders. When the user selects an order, for example, order 1802, the RBMS displays details of the individual order.

Figure 19A:
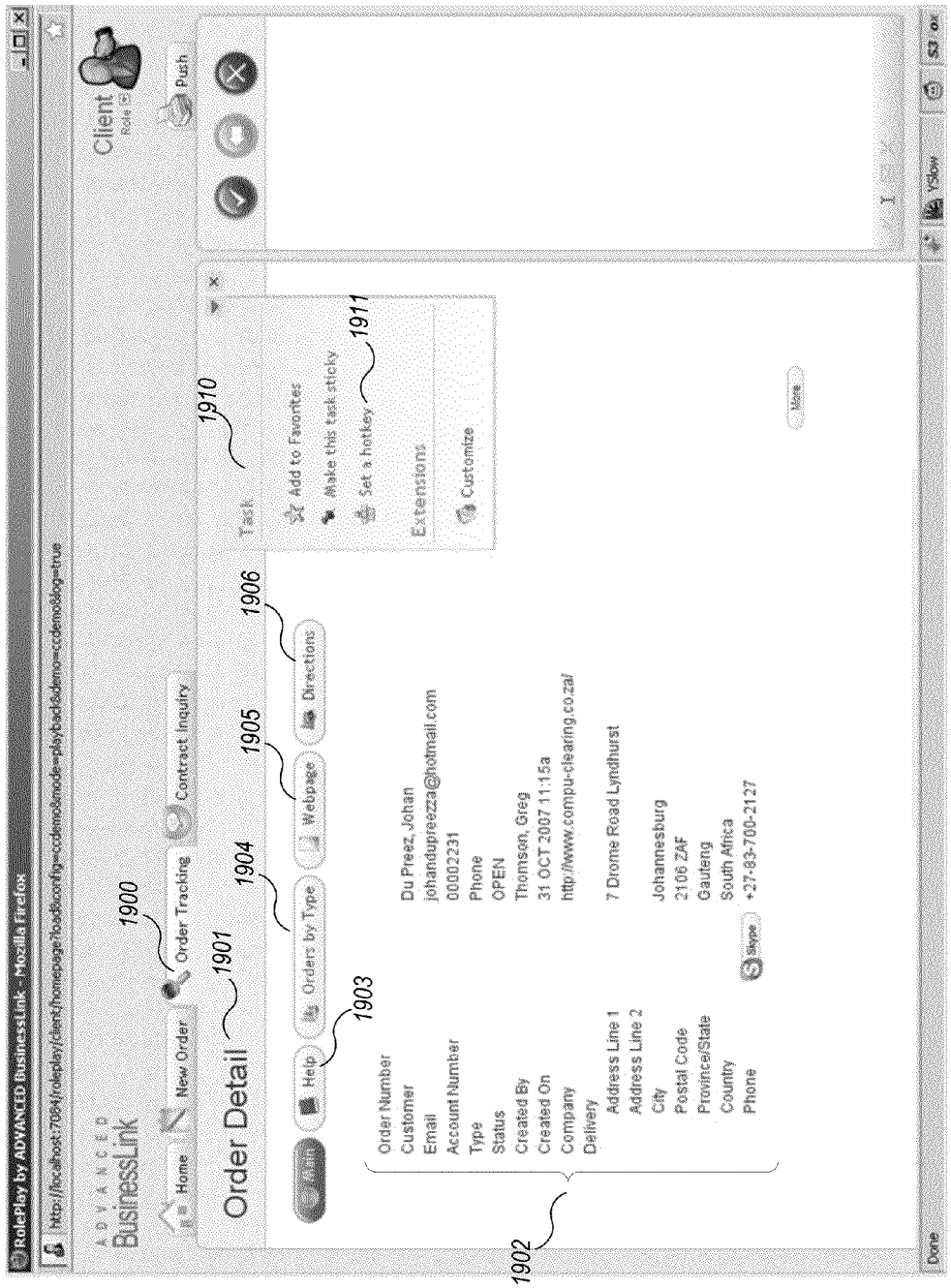
FIGS. 19A-19G are example screen displays of a process for setting up hotkey access to legacy and non-legacy tasks for immediate access to a running task.
Figure 19B:
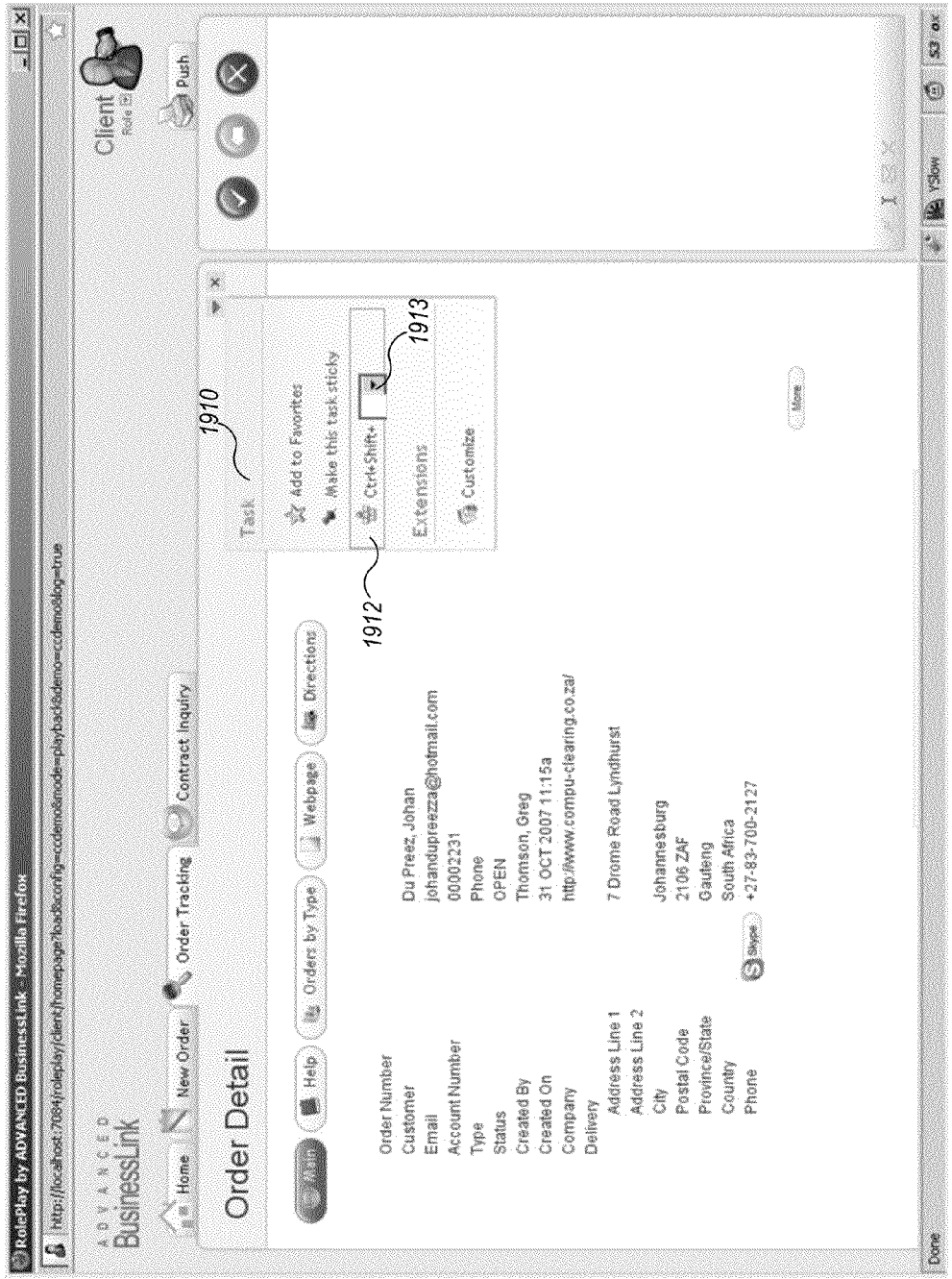
Figure 19C:
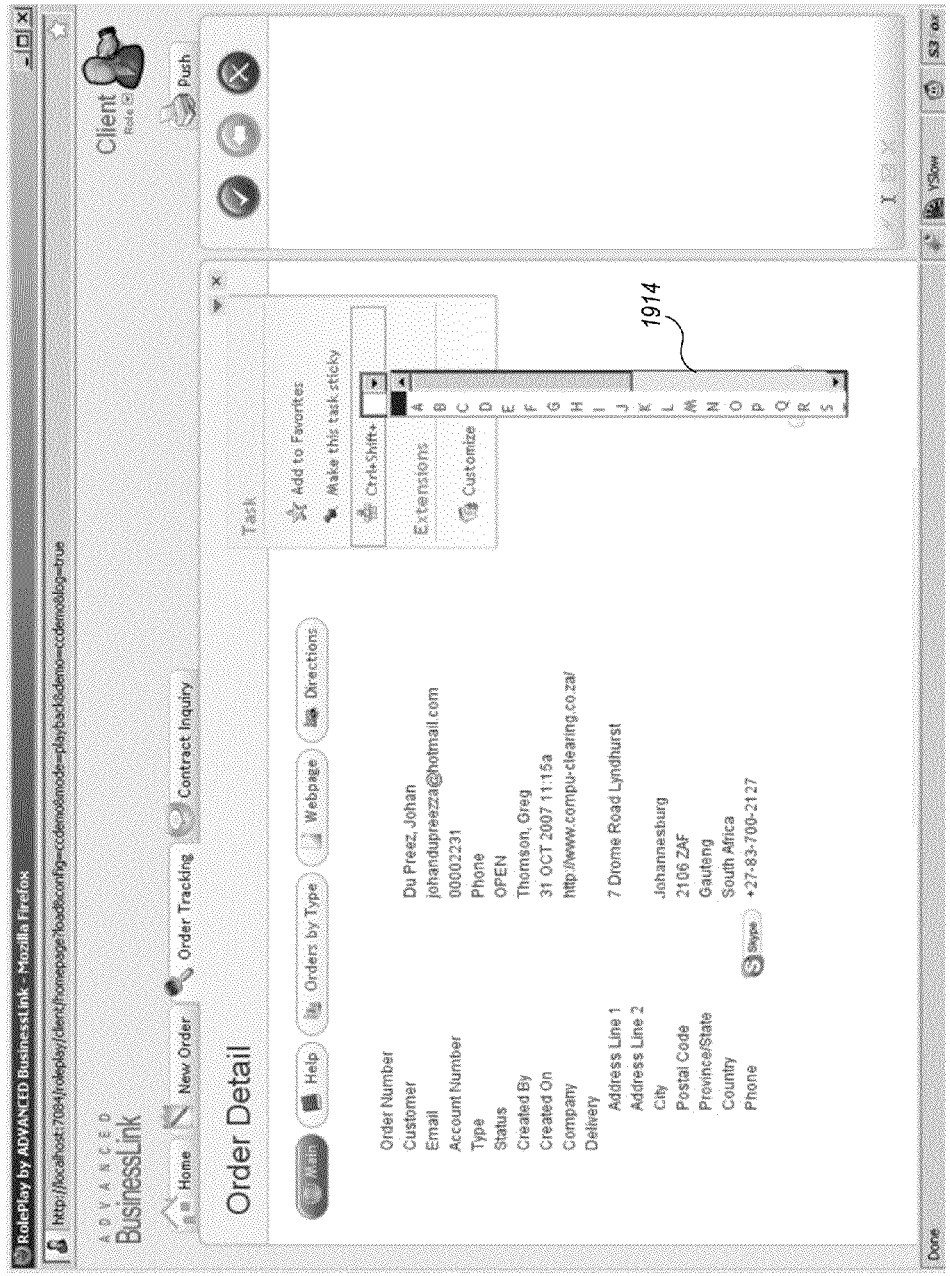

FIGS. 19A-19G are example screen displays of a process for setting up hotkey access to legacy and non-legacy tasks for immediate access to a running task. In FIG. 19A, an example order detail screen is shown corresponding to order 1802 in FIG. 18. The Order Tracking task workspace area 1900 is now displaying the "sub-" task contents for an Order Detail task, as indicated by the task name "Order Detail" 1901. There are 4 task extensions 1903-1906 available for this task, which include a mix of legacy and non-legacy task extensions. The main area 1902 of the task workspace area 1900 displays the details of an order selected at the Order Tracking level. In an example embodiment, in order to assign a hotkey to the order detail task, the user selects the "Set a hotkey" menu item 1911 from the task menu 1910. The RBMS next requests user selection of the particular key combination, for example, using the UI controls 1913 and 1914, for menu item 1912, as shown in FIGS. 19B and 19C. Once the hotkey is selected for a task, it can thereafter be used to directly access the associated task in one user action.

Figure 19D:
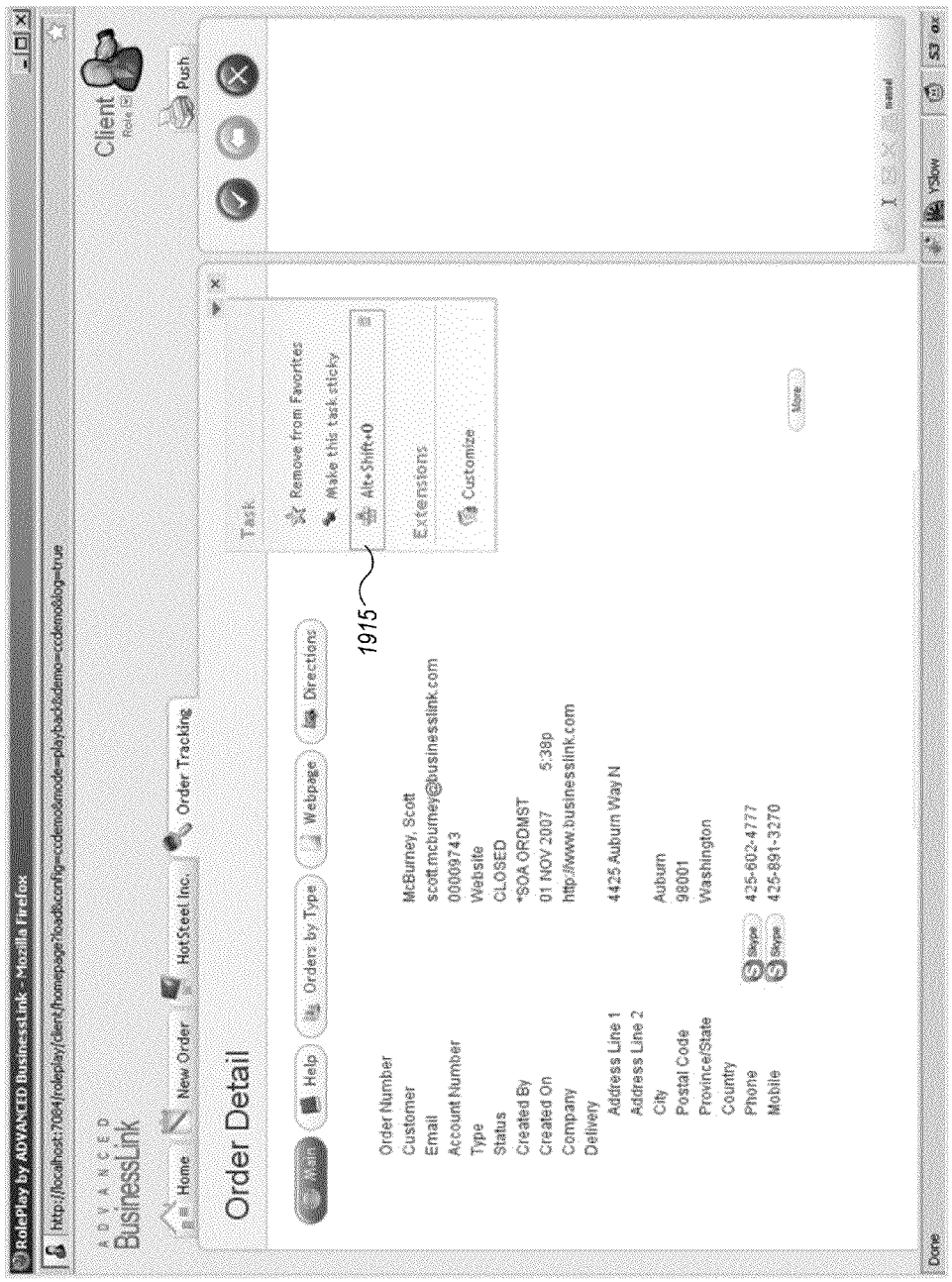
Figure 19E:
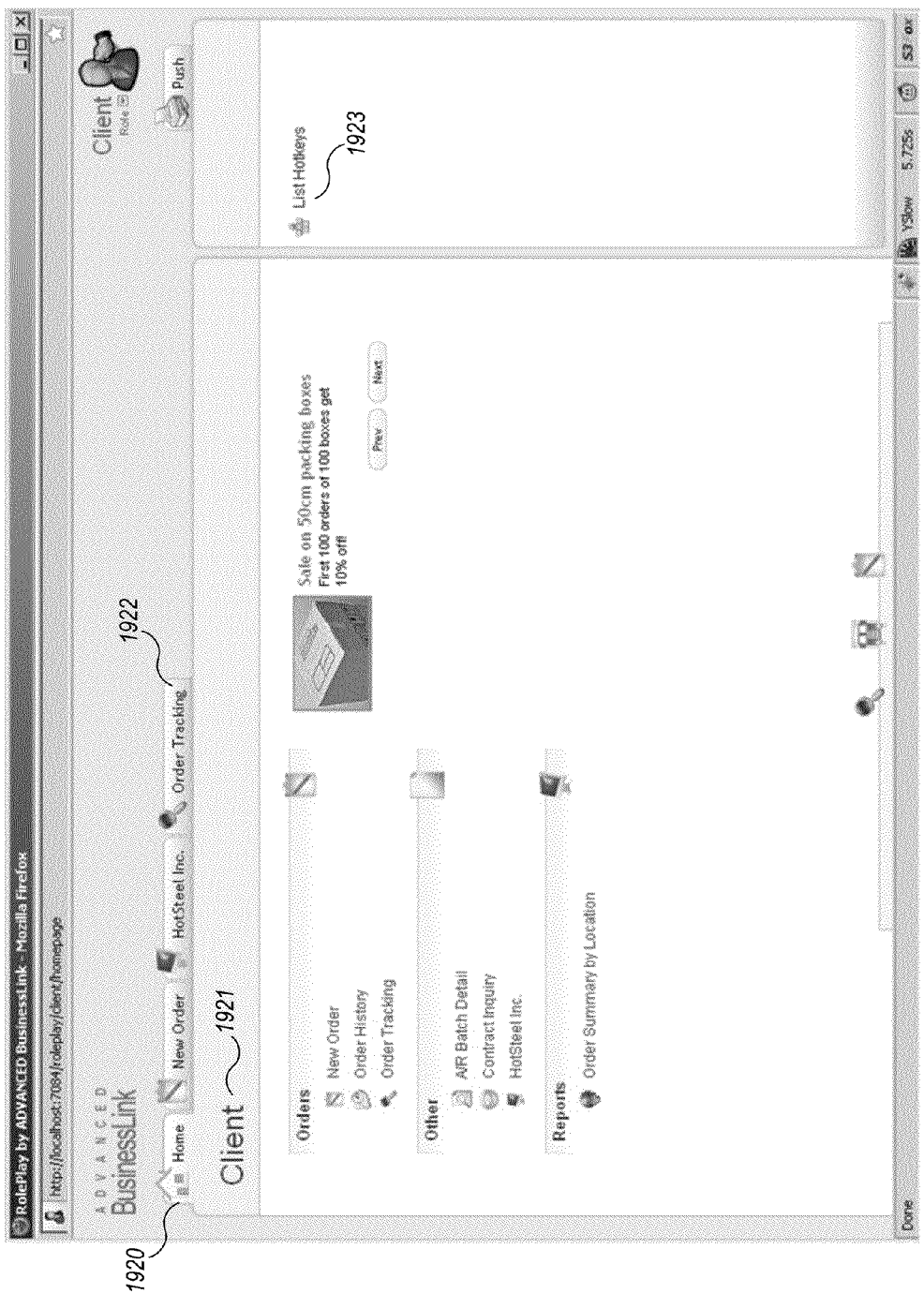

As an example, suppose the Alt+Shift+O hotkey combination has been chosen to be associated with the order detail record shown in FIG. 19D. When the user indicates the hotkey combination "Alt+H" (a system wide hotkey combination) the user is returned to the home desktop associated with the current role, in this case the client role, as shown in FIG. 19E. As can be seen in FIG. 19E, the Home task workspace area 1920 is currently displayed. The Order Tracking task, indicated by tab 1922 has been placed in the background (it is still running). A list of all of the hotkeys available for the current role can be accessed through UI control 1923.

Figure 19F:
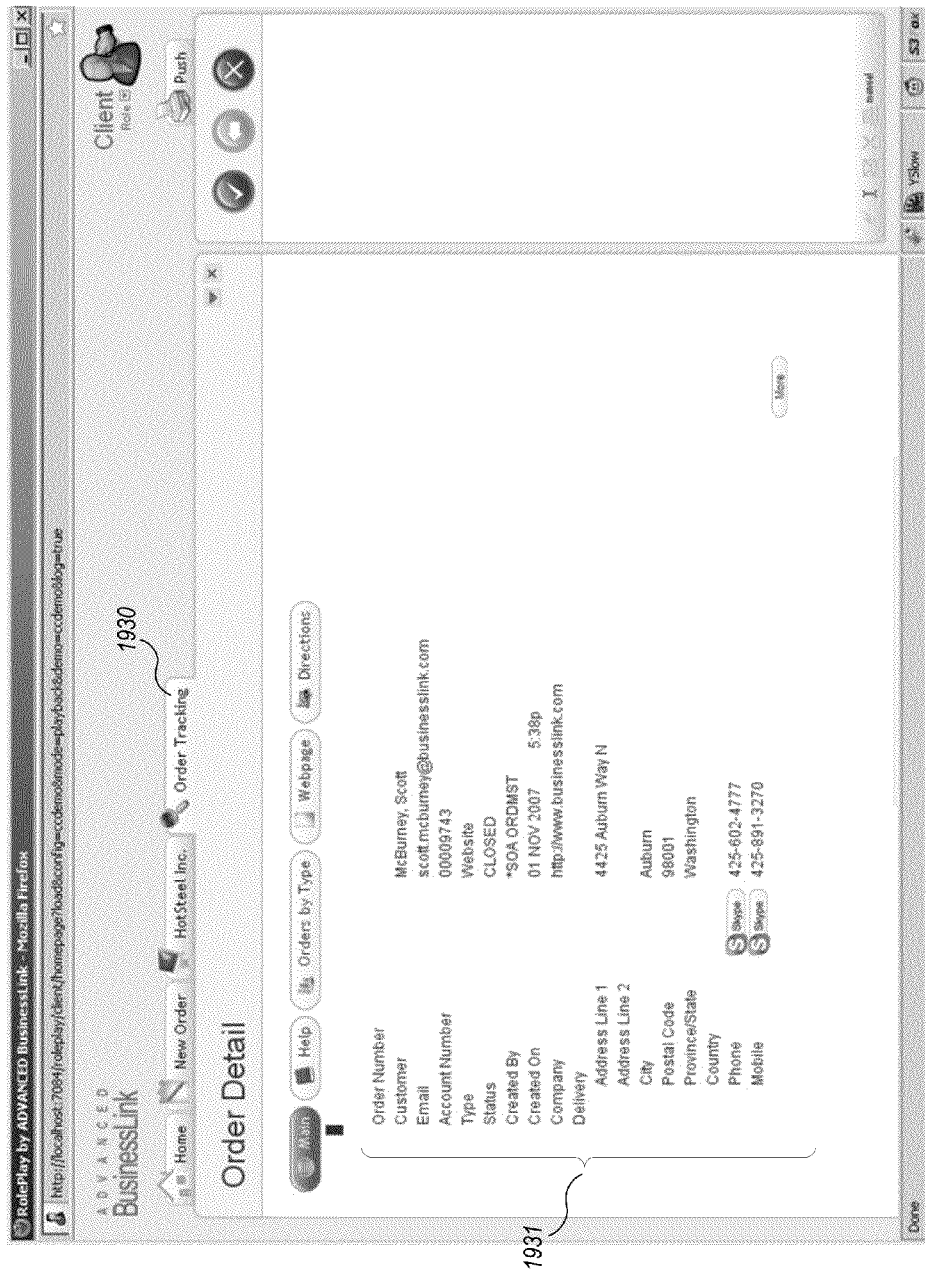

When the user wishes to go back to the order detail record shown in FIG. 19D, the user can simply press the "Alt," "Shift," and "O" keys in combination. FIG. 19F is an example screen display of the resulting screen. Of note, the screen displayed in FIG. 19F corresponds to the current screen for the order detail task shown in FIG. 19D. Since the task has continued to run, any updates would be displayed as well.

Figure 19G:
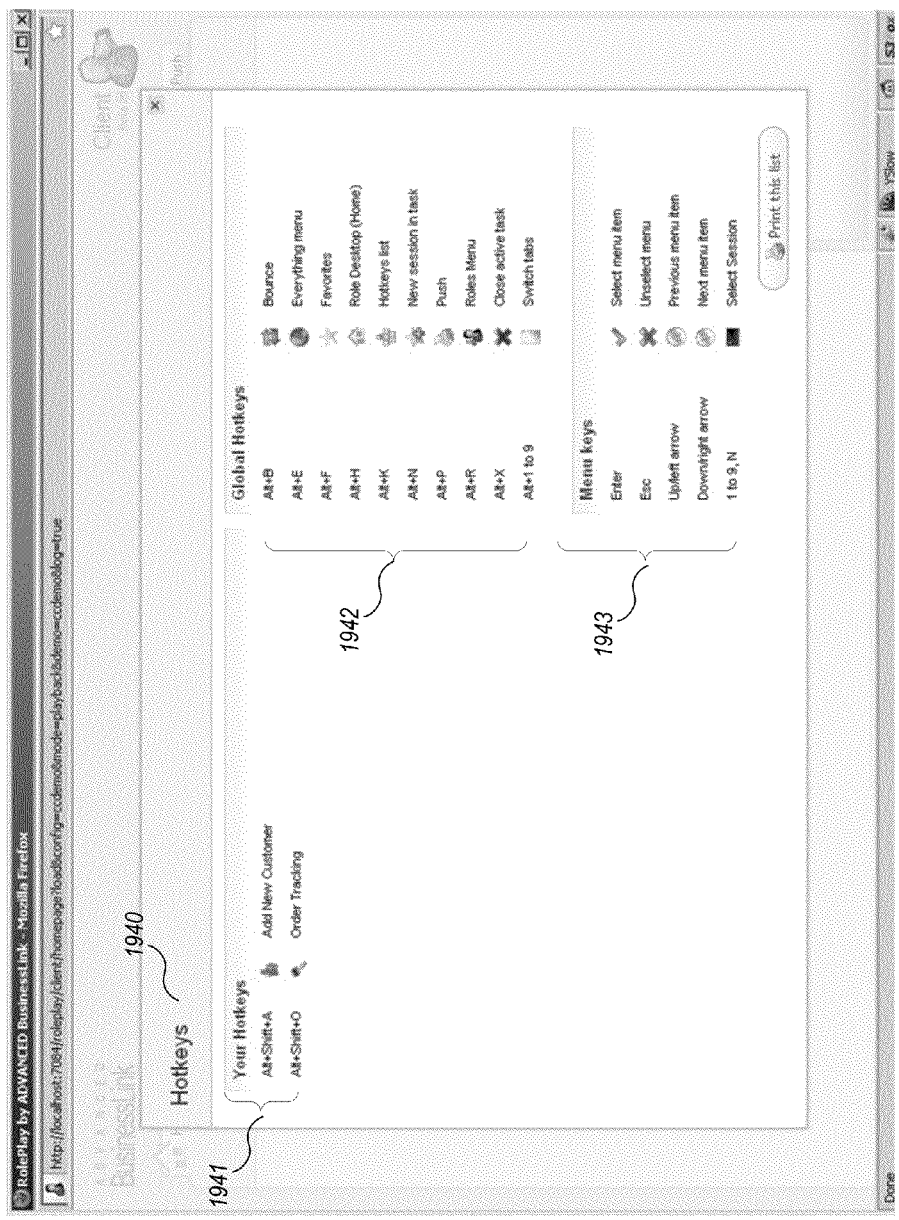

FIG. 19G is an example screen display of hotkeys available to the user, for example, as a result of selecting the list of hotkeys indicator 1923 in FIG. 19E. The Hotkeys area 1940 includes a description of the user defined hotkeys 1941, a description of available global hotkeys 1942, and menu shortcuts 1943.

Other and/or different aspects, although not shown, may be similarly integrated or presented to role-modernized tasks and applications.

Legacy applications typically comprise a series of individually executable tasks grouped into like-kind modules. Each such task is typically accessible via a single menu item on a menu, which may be part of a very large hierarchy of menus. In a typical enterprise legacy application, the modules typically comprise tens of thousands of tasks which are likewise accessed via tens of thousands of menu items.

The RBMS reorganizes such menu structured legacy applications into roles as a means for providing modernization that allows instant access to tasks, thereby avoiding the menu driven (procedural) user interface altogether. Role-based modernization insures that tasks associated with a role are accessible to users that are using the application in that role, i.e., have proper authorization to conduct the associated tasks. In addition, role modernization supports the ability to extend legacy applications and tasks with non-legacy functionality in a seamless fashion, regardless of the source of the function. For example, in some embodiments the legacy tasks for a single "application" may be executing on remote computing systems from each other. The location of each task can be made purposefully transparent to the user.

Figure 6:
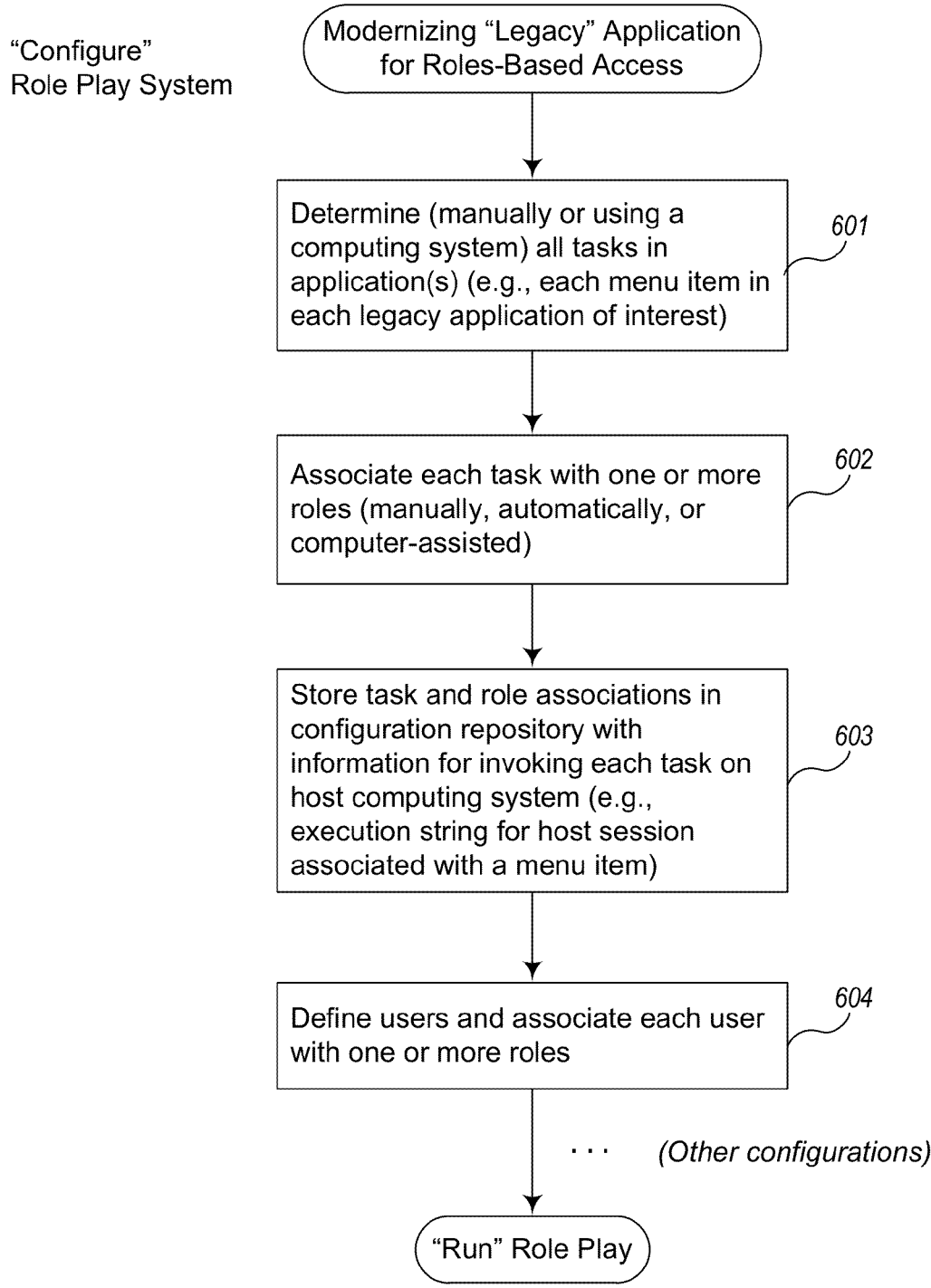
FIG. 6 is an example block diagram of an example process for reorganizing a legacy application by role for use with a Role Based Modernization System such as the RolePlay.

FIG. 6 is an example block diagram of an example process for reorganizing a legacy application by role for use with a Role Based Modernization System such as the RolePlay. In one example embodiment, in block 601, the tasks in the application(s) that are part of the legacy application or application suite are determined as part of a "reorganization" phase of the role-based modernization configuration process. This determination may be an automated process whereby a computing system is used to "harvest" the possible tasks from a menu driven application definition or may be a manual or semi-automated process. In an example embodiment, it is assumed that each menu item on any menu no matter how deep, is a potential task. A list of these tasks is created as a result of performing block 601. Other organizations of tasks can similarly be incorporated, such as applications where tasks are associated at some menu levels but not others.

In block 602, each task is associated with one or more roles, as defined by the modernizer of the system. This block again may be performed manually, automatically by a computing system, or semi-automatically. For example, a "wizard" application may be provided in this reorganization configuration phase to assist the user in providing role names and associating one or more roles with each task. In some embodiments, a limitation is placed on the number of tasks per role before the role is to be subdivided into a plurality of smaller roles with lesser numbers of tasks per role. Again, in some RBMS systems this is done manually.

In block 603, the task and role associations are stored in some kind of configuration repository data structure. Information for invoking the task on the host computing system is also stored. For example, an invocation string associated with a menu item that corresponds to a task may be stored as this invocation information string.

In block 604, users are defined and associated with one or more roles are part of the configuration process. Then, the RBMS (here, RolePlay) is run.

FIG. 7 is an example block diagram of an example data structure for storing role-based task associations for implementing role-based modernization of legacy applications. In data structure 700, a list of tasks 701 is provided during the reorganization phase. One or more of possible roles 710 is indicated as associated with each task. In addition, an execution specification such as an invocation string is indicated as associated with each task, so that when the task is initially run the RBMS knows what to pass to the host computing system to cause the task to be executed. For example, task N 704 is indicated as associated with execution spec N by specification 705 and with Role D by role indicator 706.

Once application tasks are reorganized by role, the RBMS can execute a multitude of tasks concurrently and allow further configurations such as hotkey access or additional non-legacy task extensions as shown in FIGS. 4, 5, and 19A-19G. Moreover, the user interface between legacy and non-legacy tasks is seamless—the RBMS provides a uniform mechanism for invoking a task and displaying the results. In addition, example embodiments of the RBMS present only a single log-on for the user. Authentication and credential management is thereafter handled automatically between the client-side and server-side of the RBMS and with the host applications.

As illustrated in FIGS. 4-7, one such RBMS for running role-modernized legacy applications is the RolePlay Environment. However, the techniques of an RBMS also may be useful to create a variety of other application modernizations and systems, including environments that present different user interfaces or for different purposes.

Figure 8:
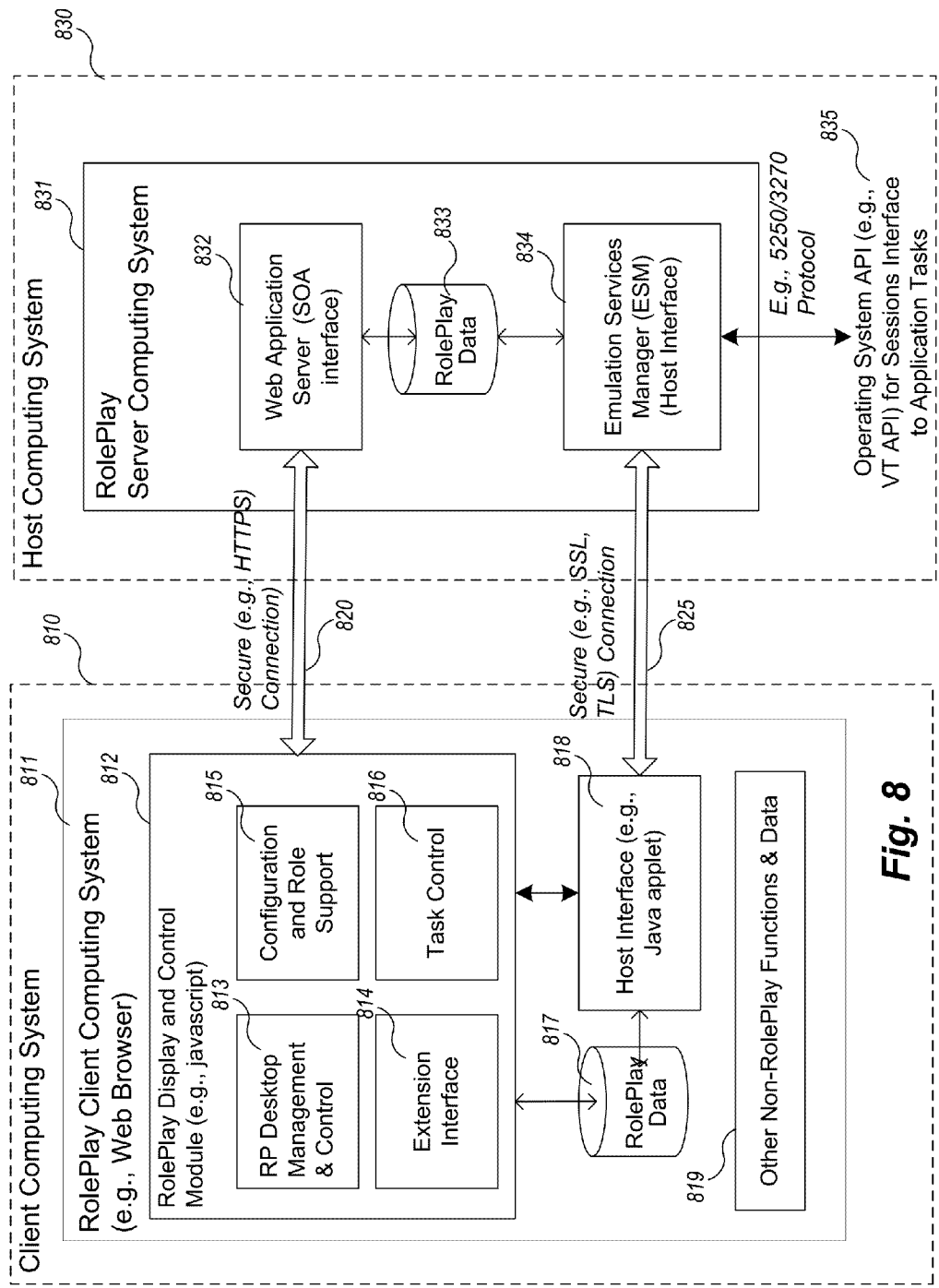
FIG. 8 is an example block diagram of components of an example Role-Based Modernization System.

In one embodiment, the Role-Based Modernization System comprises one or more functional components/modules that work together to provide role-based modernization of legacy applications. These components may be implemented in software or hardware or a combination of both. FIG. 8 is an example block diagram of components of an example Role-Based Modernization System. Client computing system 810 communicates with Host computing system 830 to run one or more legacy applications. The Role Play RBMS comprises a client portion, the RolePlay Client Computing System 811, which may be for example run as part of a Web browser application, and a server portion, the Role Play Computing System 831. In the example illustrated, the client portion 811 comprises a display and control module 812, one or more RolePlay data repositories 817, a host interface 818 for communicated with the legacy tasks, and other non-RolePlay functions and data 819. The display and control module 812 further comprises an RP Desktop Management and Control module 813 for handling the presentation events and support; a configuration and role support module 815 for providing, managing and storing configuration of applications, roles, and users; an extension interface 814 for providing and managing task extensions and role extensions; and a task control module 816 for managing task-related state and other data. The server portion 831 comprises a Web Application server (e.g., a Service-Oriented Architecture—SOA-server that responds to messages), one or more RolePlay data repositories 833, and an Emulation Services Manager (ESM) 834. The ESM talks to the host operating system API using appropriate emulation protocols (e.g., IBM 5250/3270) to interface to the legacy application tasks.

It is important to note that these host applications have not been reprogrammed to run with the RBMS—access to them has been reorganized according to role during a configuration process such as the one described with reference to FIGS. 6 and 7. A terminal emulator, here Emulation Services Manager (ESM) 834, still is used to invoke each task through a standard host interface (e.g., using the appropriate protocol such as IBM 5250/3270) as if a menu item were selected by an end user. A difference is that from the end user's point of view a completely modernized and seamless access to each task, legacy or not, is provided. In the embodiment shown, the emulator ESM runs on the host machine itself so as to transparently provide any required session access to the application tasks. Other embodiments may provide an emulator in other locations such as on the client computing system 810 or on another system.

The implementation shown in the embodiment illustrated in FIG. 8, shows client portion 811 divided into a javascript portion, display and control module 812, and a java applet portion, host interface 818. The java applet 818 is used to communicate directly and efficiently over a secure communications connection (e.g. using SSL or TLS) to the ESM 834. The javascript portion 812 is used to interface to the Web Application (SOA) Server 832 over a separate secure connection using, for example, HTTPS. This division of labor is done to allocate functionality to the most appropriate tool and to allow the legacy task to output concurrently without interference from other functions being presented on the RolePlay display. In a typical embodiment, the java applet 818 is loaded as a consequence of an initial startup sequence on the client side (e.g., the user navigates to a website—url—for example, "www.roleplay.com") and is instantiated inside of a Web Browser. Also, to the extent possible, one or more configuration files are downloaded upon the client-side startup procedure, which define the roles, tasks, initial extensions, user associations if any, etc.

Figure 9:
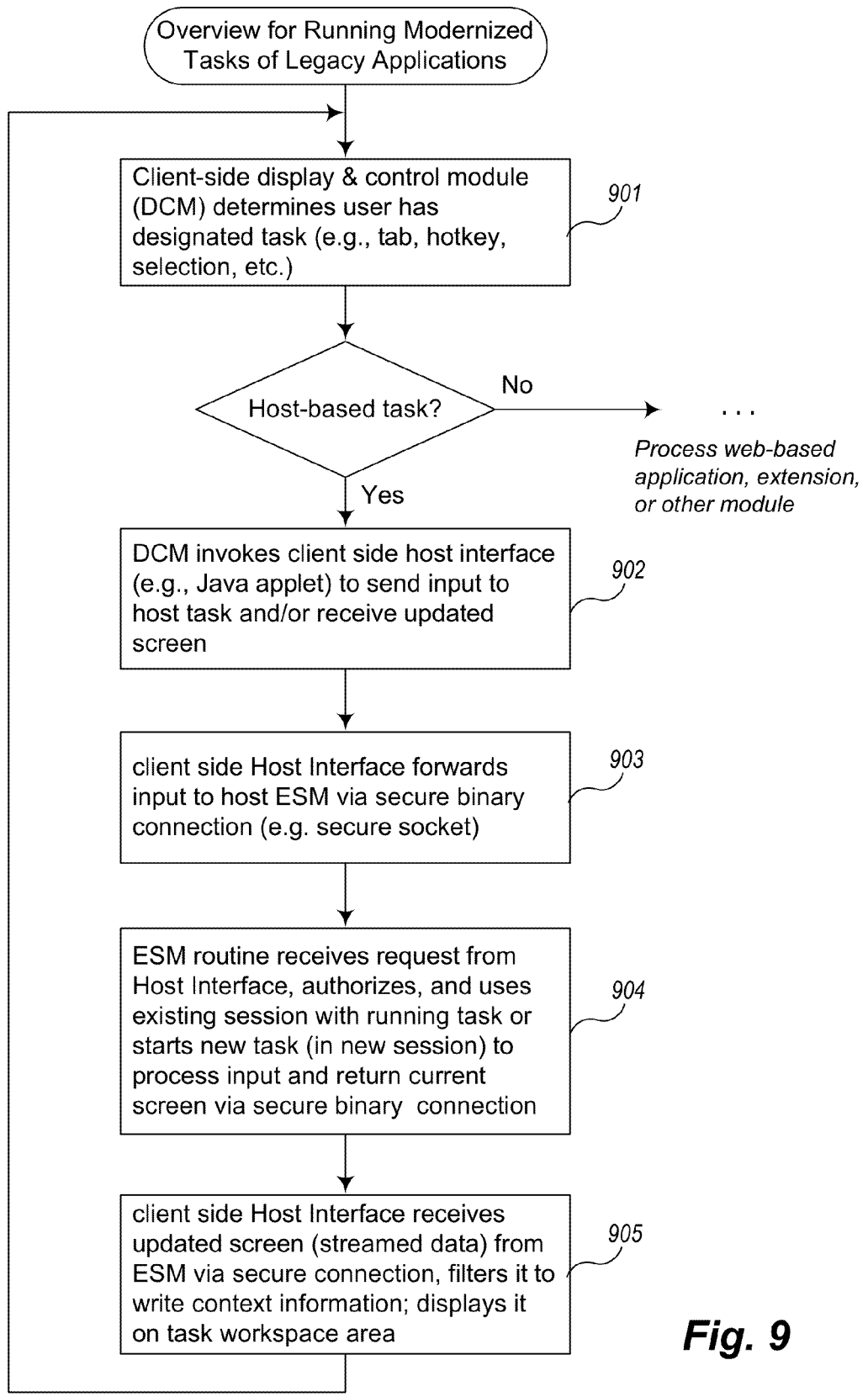
FIG. 9 is an example block diagram of an overview of an example process for running legacy applications that have been modernized according to role-based modernization techniques.

The display and control module 812 in conjunction with the host interface 818 use secure communications channel 825 to communicate with ESM 834 to invoke legacy applications modernized using role-based modernization techniques and to display them for user input/output on a display screen associated with the client computing system 810. FIG. 9 is an example block diagram of an overview of an example process for running legacy applications that have been modernized according to role-based modernization techniques. In block 901, the client-side display and control module (DCM) 812 determines a designated task, for example, as a result of a user selecting an indicator link to the task (e.g., link 421 in FIG. 4), a hot-key, a link on the favorites dock (e.g., link 451 in FIG. 4), etc. Next, the DCM 812 determines the designated task is a legacy task (requiring communication with the host computing system 830), and if so continues to execute at block 902, otherwise continues with other processing to process the non-legacy task such as a web-based application, extension, or other code/logic module. In block 902, the DCM 812 invokes the client-side host interface (Java applet) 818 to forward input to the host task and/or to receive an updated "screen" from the host task. In block 903, the client-side host interface 818 forwards any input received to the host ESM 834 via the secure binary connection (e.g., secure socket layer) 825.

In block 904, the ESM routine, which is listening on connection 825, receives the request from the client-side host interface, authorizes the user, and determines which task as been designated. Assuming the designated task corresponds to an already running task, in one embodiment, the ESM finds the appropriate session corresponding to the task and forwards the received input. In such an embodiment the ESM or other accessible module is responsible for tracking what tasks are running, in which sessions etc. Alternatively, if the designated task corresponds to a new task to be run, the ESM initiates a new session, invokes the task, and stores task identifying information. Of note, the ESM separately authenticates the credentials of the user to authorize the task invocation so as to prevent spoofing of the user. The ESM can perform this function using the original credentials supplied by the user in an initial log-on procedure. In some embodiments as described with respect to FIGS. 15 and 16, sessions may be pooled, in some cases by user, and the ESM may allocate one of the pooled sessions to run the newly requested task. The task associated information is stored in the RolePlay data repository 833.

Eventually, in block 905 the client-side host interface 818, which is listening on connection 825, receives an updated screen (i.e., streamed data) from the ESM via connection 825, filters it according to a set of rules implemented by a rules engine, writes context information such as what names, phone numbers and addresses are found, modernizes the screen according to a set of modernization rules and eligibility criteria, and displays it on its associated canvas. Examples of the modernization rules applied by the client-side host interface 818 include instructions in the event of detecting certain text such as phone numbers and can result in the "Skype" link 521 presented in FIG. 5 when the interface 818 detects a phone number. This allows for further dynamic modernization to role-based modernized legacy tasks. The client-side host interface 818 is also detecting the present of certain data in the data stream to decide whether eligibility criteria are met. For example, when defining a task extension, one can define when it is displayed. This timing gets translated to a "rule" which is used by a rules engine portion of the host interface 818 to detect whether it is appropriate to place a button to be used to invoke the task extension in the display of the data stream on its canvas. A call-back function is registered with the button, so that later selection of the button will cause a call-back into the code of the client side display and control module (e.g., the extension interface 814 of the javascript module 812) to cause the associated extension code to be executed.

The associated canvas is the current task workspace area displayed, so the received updated host screen is then displayed to the user. The context information is written to a context list, for example stored in RolePlay data repository 817, so that the display and control module components can access the information and act upon it if they so desire or forward it to consumer code, such as task extensions.

The role-based modernization techniques of RolePlay and the RBMS are generally applicable to any type of legacy application task. For example, the phrase "task" is used generally to imply any type of code module that is separately executable by a host computing system. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a Role-Based Modernization System to be used for accessing applications that have been modernized by reorganizing them by role. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 10:
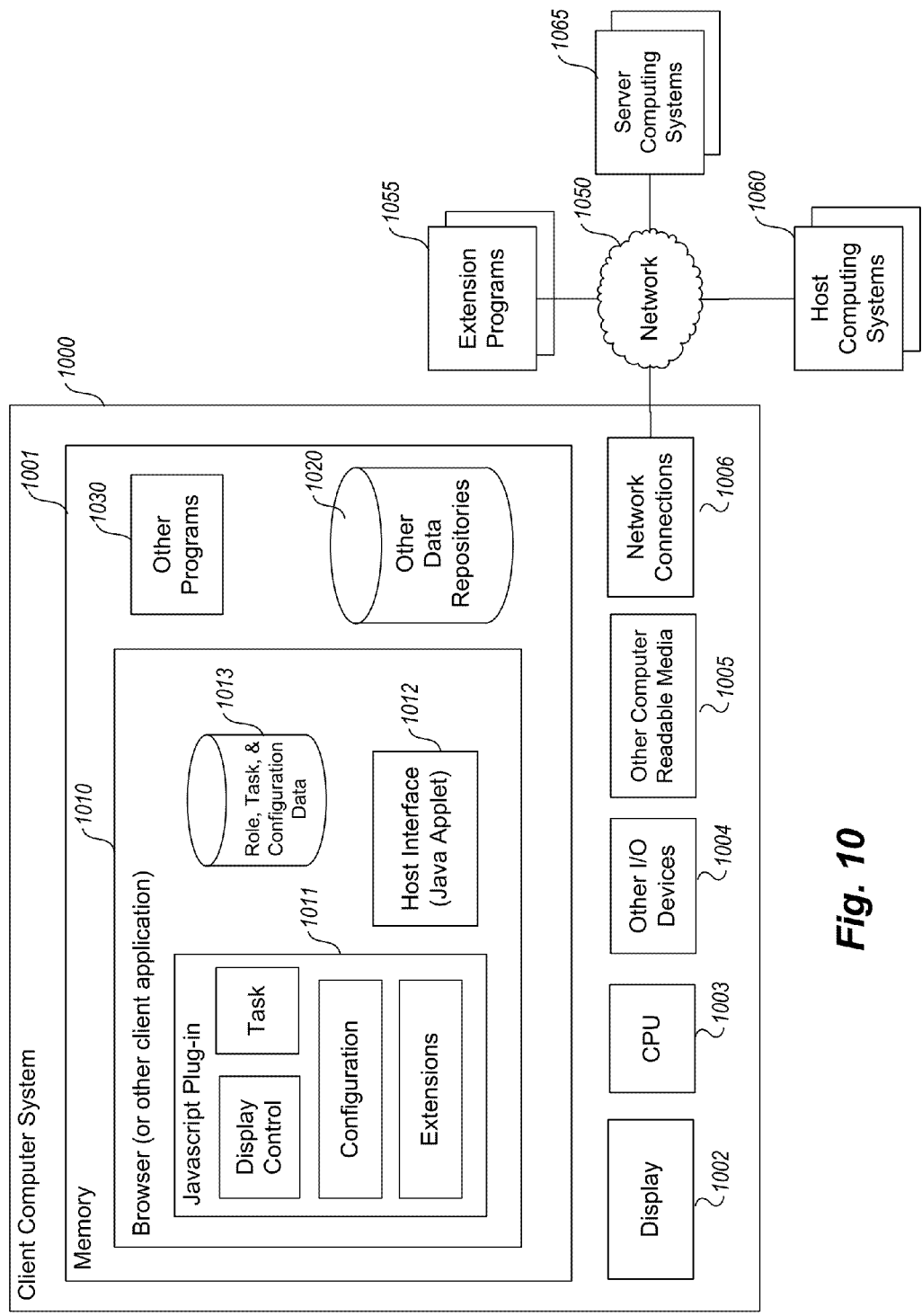
FIG. 10 is an example block diagram of a computing system for practicing embodiments of a client computing system of a Role-Based Modernization System.

FIG. 10 is an example block diagram of a computing system for practicing embodiments of a client computing system of a Role-Based Modernization System. Note that a general purpose or a special purpose computing system suitably instructed may be used to implement an RBMS. Further, the RBMS may be implemented in software, hardware, firmware, or in some combination to achieve the capabilities described herein.

The computing system 1000 may comprise one or more server and/or client computing systems and may span distributed locations. In addition, each block shown may represent one or more such blocks as appropriate to a specific embodiment or may be combined with other blocks. Moreover, the various blocks of the Role-Based Modernization System 1010 may physically reside on one or more machines, which use standard (e.g., TCP/IP) or proprietary interprocess communication mechanisms to communicate with each other.

In the embodiment shown, computer system 1000 comprises a computer memory ("memory") 1001, a display 1002, one or more Central Processing Units ("CPU") 1003, Input/Output devices 1004 (e.g., keyboard, mouse, CRT or LCD display, etc.), other computer-readable media 1005, and one or more network connections 1006. The RBMS installed as part of Web Browser or other client application 1010 is shown residing in memory 1001. In other embodiments, some portion of the contents, some of, or all of the components of the RBMS 1010 may be stored on and/or transmitted over the other computer-readable media 1005. The components of the Role-Based Modernization System 1010 preferably execute on one or more CPUs 1003 and manage the reorganization and modernizations of legacy tasks as described herein. Other code or programs 1030 and potentially other data repositories, such as data repository 1020, also reside in the memory 1001, and preferably execute on one or more CPUs 1003. Of note, one or more of the components in FIG. 10 may not be present in any specific implementation.

In a typical embodiment, the RBMS installed in Web Browser or other client application 1010 includes one or more Javascript plug-ins 1011, a Java applet host interface 1012, and role, task, and configuration data data repository 1013. In at least some embodiments, the data repository 1013 is provided external to the RBMS and is available, potentially, over one or more networks 1050. Other and /or different modules may be implemented. In addition, the RBMS may interact via a network 1050 with application or other extension code 1055 that uses data received from legacy applications and stored in the data repository 1013, one or more host computing systems 1060, and/or one or more server computing systems 1065. Also, the role, task, and configuration data data repository 1013 may be provided external to the RBMS as well, for example in a knowledge base accessible over one or more networks 1050.

In an example embodiment, components/modules of the RBMS 1010 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an RBMS implementation.

In addition, programming interfaces to the data stored as part of the RBMS Web Browser or other client application process 1010 (e.g., in the data repository 1013) can be made available by standard means such as through C, C++, C#, and Java APIs; libraries for accessing files, databases, or other data repositories; through scripting languages such as XML; or through Web servers, FTP servers, or other types of servers providing access to stored data. The repository 1013 may be implemented as one or more database systems, file systems, or any other method known in the art for storing such information, or any combination of the above, including implementation using distributed computing techniques.

Also the example RBMS Web Browser or other client application 1010 may be implemented in a distributed environment comprising multiple, even heterogeneous, computer systems and networks. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of an RBMS.

Furthermore, in some embodiments, some or all of the components of the RBMS may be implemented or provided in other manners, such as at least partially in firmware and/or hardware, including, but not limited to one ore more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 11B:
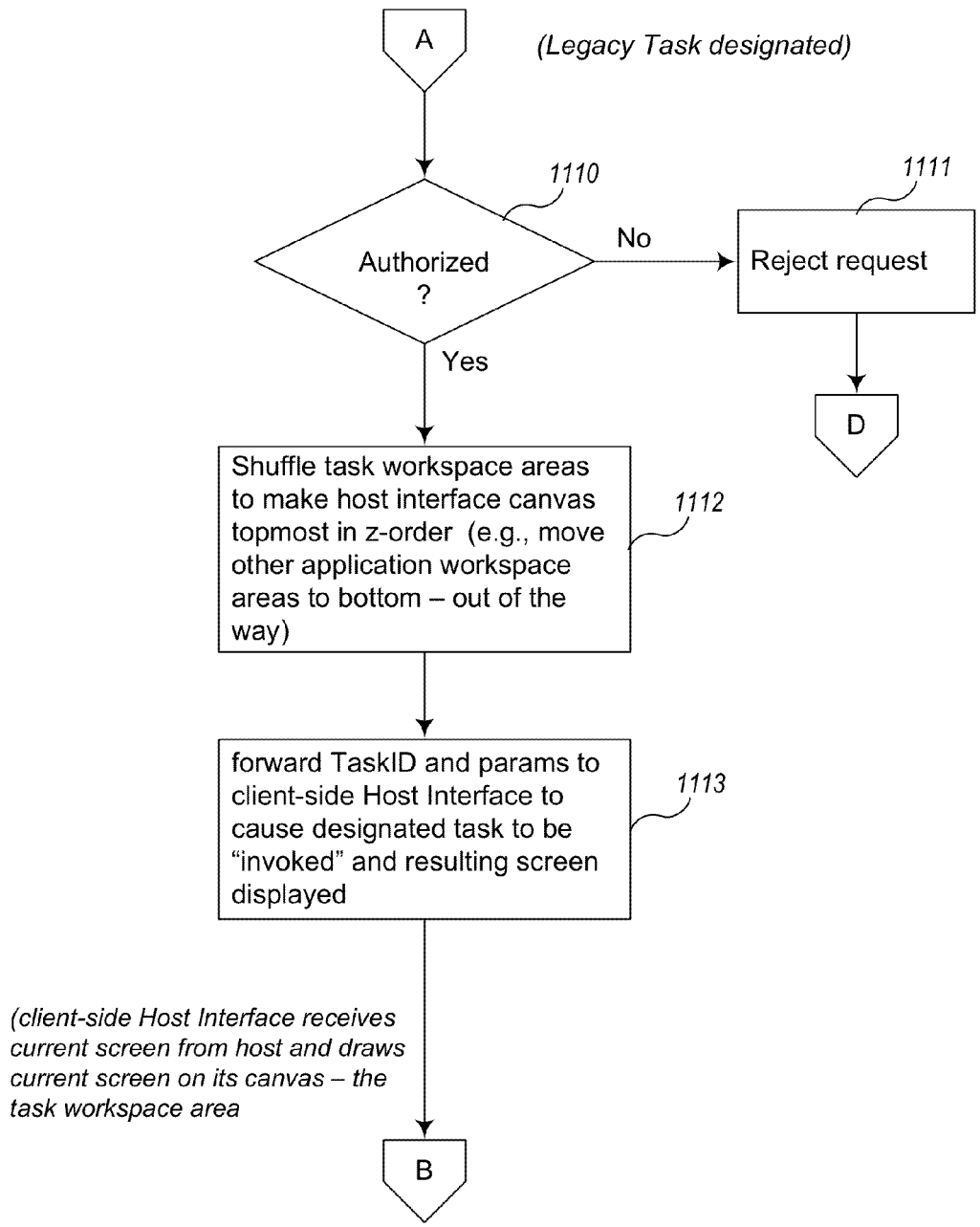
Figure 11C:
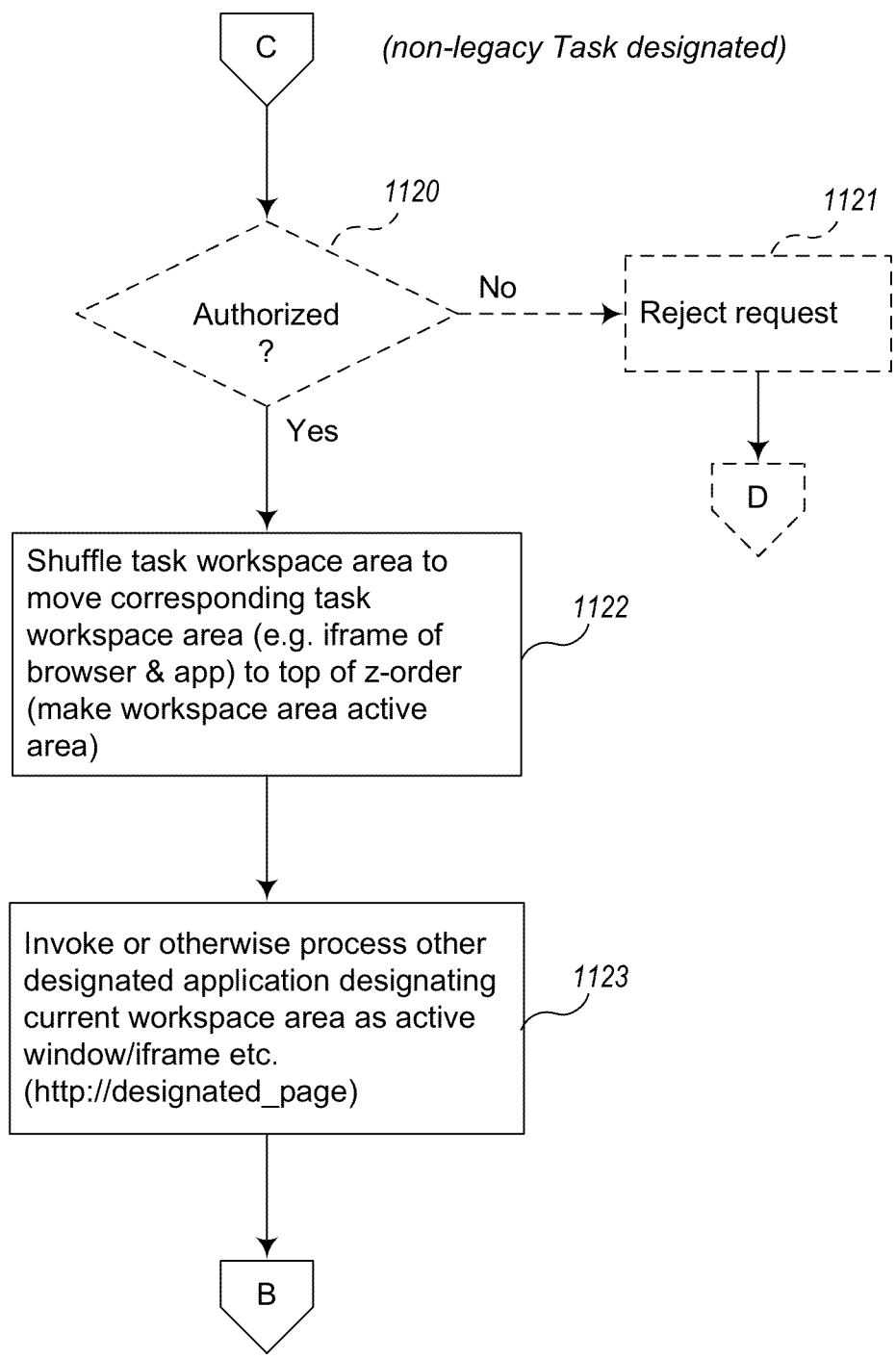

As described above, one of the functions of the client-side RBMS is to provide a uniform interface for accessing tasks, be they legacy tasks or non-legacy tasks. FIGS. 11A-11C are example flow diagrams of example logic used by a desktop management and control module of an example Role-Based Modernization System to provide uniform access. This event handler logic may, for example, be implemented by the Role-Play Display and Control module 812 of FIG. 8. Blocks 1101-1123 provide an event loop for processing different types of tasks and functions. A uniform interface to the various tasks is effectuated by essentially shuffling the task workspace areas between executing tasks, so that the current task's workspace area is "on top" in the display order. For example, task workspace area 405 in FIG. 4 is "replaced by" (by manipulating the z-order of) task workspace area 520 in FIG. 5 when the Order Tracking task is selected by selecting the Order Tracking tab 412 in FIG. 4. In a windowing type system, the z-order refers to the z-axis—or depth into the display screen. That is, a location in the z-order dictates what screen real-estate appears on top of what.

More specifically, in block 1101, the module determines what kind of task has been designated; that is, whether an extension, legacy (host) task, or other application module has been designated. Such designation may occur, for example, by means of a mouse or other input device selection, an ALT-TAB selection technique, a hotkey, a selection of an indicator on the favorites dock, etc. In block 1102, if the designated task is an extension, then the module continues its processing at block 1103, otherwise continues at block 1305.

In block 1103, the module processes the designated extension by bringing the task workspace area associated with the extension to overlay the prior task workspace area by moving the task workspace area associated with the extension to the top of the z-order. This workspace area associated with the extension thereby becomes the "current" task workspace area. The task workspace area of the extension may be a portion of the task workspace area of the underlying task, so that it appears part of that task. In block 1104, the module invokes the extension designated the current task workspace area for its output. The extension may be a "role" extension—which is code that is authorized for all users of a particular role—or may be a task extension—which is code that is associated with a particular task and a set of eligibility criteria that dictate its availability or not. The module then continues in block 1106 to process, display, or forward any filtered or contextual information created by the output of the invoked extension.

In block 1105, when the module has determined that the designated task is not an extension, the module further determines whether the designated task is a legacy task, thus requiring communication with an associated host system. If so, the module continues at block 1110; otherwise, the module continues at block 1120.

In block 1110, the module determines whether the user credentials indicate that the user is authorized to run the designated legacy task. If so, the module continues in block 1112, otherwise, the module rejects the request in block 1111, and returns to the beginning of the event loop to wait for another input event. In some embodiments this determination is a secondary determination of authorization as the client RBMS has already performed a check. Such double-checking prevents against another system or user spoofing the RBMS by masquerading as the user. In block 1112, the module shuffles the task workspace area to insure that the canvas associated with the java applet host interface (e.g., java applet 818 in FIG. 8) is topmost in the z-order. This may be accomplished in some windowing systems by moving the other task workspace areas to the bottom. Of note, other implementations that utilize a different type of host interface may require other or different actions to insure that the canvas (or task workspace area) of the host interface is topmost in the z-order. In block 1113, the module forwards an identifier of the designated task and appropriate input parameters to the client-side host interface (e.g., java applet 818 in FIG. 8) to cause the designated task to be run on the host computing system and a resulting screen to be displayed on the client task workspace area (the canvas in this case). The module then continues in block 1106 to receive the output from the invoked task and to process, display, or forward any filtered or contextual information created by the output of the invoked task.

In block 1120, when the module has determined that the designated task is not a legacy task, the module processes the designated non-legacy task and determines whether the user credentials indicate that the user is authorized to run the designated non-legacy task. If so, the module continues in block 1122, otherwise, the module rejects the request in block 1121, and returns to the beginning of the event loop to wait for another input event. Again, in some embodiments this determination is a secondary determination of authorization as the client RBMS has already performed a check.

In block 1122, the module shuffles the task workspace area associated with the designated non-legacy task to insure that it is topmost in the z-order and becomes the current task workspace area. In block 1123, the module invokes or otherwise processes the designated non-legacy task/application/code and designates the current task workspace area as the active window/iframe etc., depending upon the implementation. The module then continues in block 1106 to receive the output from the invoked task/application/code and to process, display, or forward any filtered or contextual information created by the output of the invoked task/application/code.

The processing at block 1106 enables the module logic to process information that has been filtered, for example, by the host interface receiving a data stream from a legacy application. Such information may be forwarded by the module logic, for example, to communicate parameters to various task extensions of the legacy task. As an example, consider the order detail legacy task output of FIG. 5. The task workspace area 520 includes several task extensions accessible through UI controls 511-514. One of these task extensions is a mapping application invoked using the directions tab 514. When the output shown in area 520 is filtered by the display and control module (e.g., 812 in FIG. 8), the address of the customer is written to the context for that legacy task. When the user then selects the mapping extension via directions button 514, the module forwards this address information from the context to the mapping task extension. In other examples, although not shown, the module itself performs some action as a result of context information received.

Figure 12:
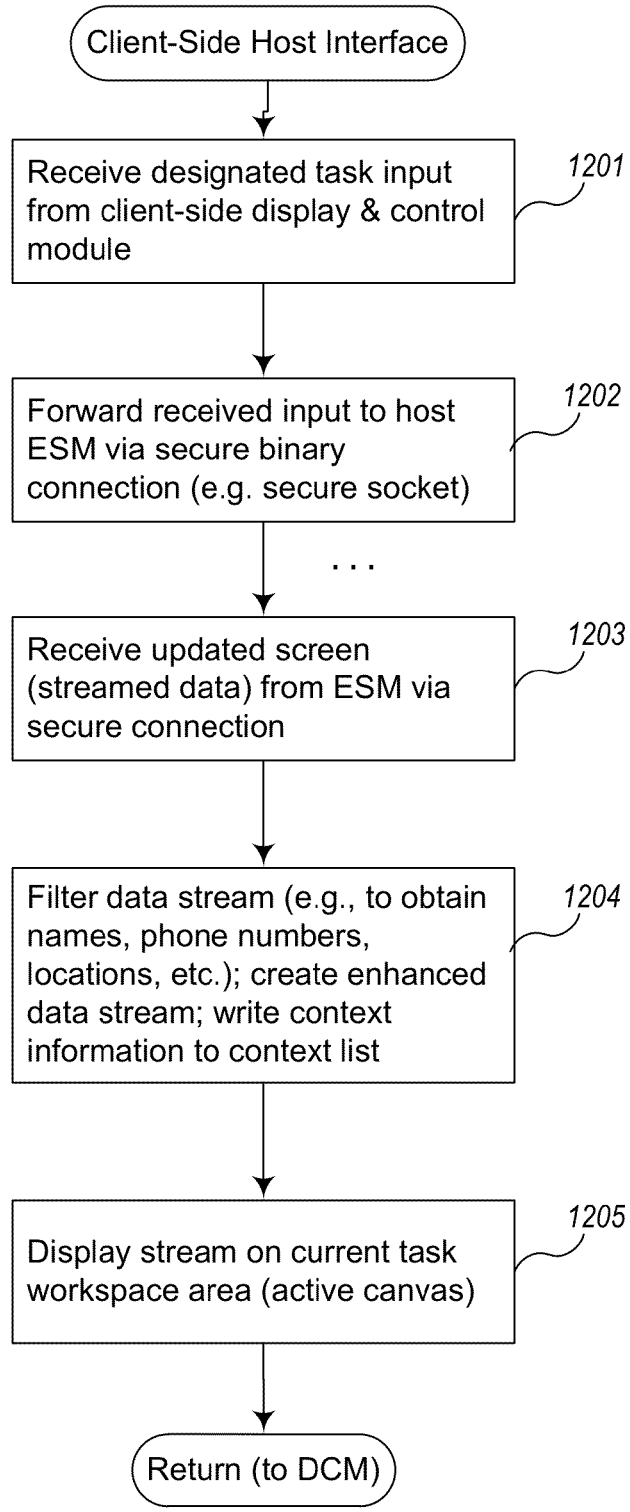
FIG. 12 is an example flow diagram of example logic use by a client-side host interface of a Role-Based Modernization System to communicate with one or more emulators on a host computing system.

FIG. 12 is an example flow diagram of example logic use by a client-side host interface module of a Role-Based Modernization System to communicate with one or more emulators on a host computing system to run legacy tasks. For example, this logic may be implemented by the host interface 818 in FIG. 8 to communicate with the Emulation Service Manager (ESM) 834 on a host computing system. In block 1201, the host interface module receives designated task input from the corresponding client-side display and control module (e.g., module 813 in FIG. 8), for example, as a result of executing block 1113 in FIG. 11B). In block 1202, the module forwards the received input and any other parameters to the appropriate host ESM via a secure connection, such as secure binary connection 825 in FIG. 8. As there may be more than one host computing system available to execute legacy tasks, the module may determine which one to use. In block 1203, the module receives updated screen information (streamed data) from the ESM via the secure connection. Although shown as synchronous flow logic, it is understood that equivalent asynchronous flow logic may be implemented. While the input is received, the host interface module filters the data stream in block 1204, for example, using a rules engine that implements modernization rules and eligibility rules (the modernization rules can also be thought of as eligibility rules). The modernization rules identify objects in the data stream that may be enhanced with GUI information, such as phone numbers, addresses etc. This dynamically created information may be added to the output to create an enhanced data stream. In addition, the eligibility rules may be used to determine when/if the module needs to add certain other capabilities to the output. For example, in the presence of certain things (like addresses), the user may have defined that a mapping program extension is to be added to the task output. It may be then the host interface module's responsibility to add the indicators (e.g., the task buttons) for invoking these extensions, if only the host interface controls its canvas/task workspace area. In block 1205, the module displays the enhanced data stream on the current task workspace area, and returns.

Of note, the different logic blocks of FIG. 12, although shown separately, may be invoked in a sort of pipeline as the data is received, rather than processing all of the data at each step.

Figure 13:
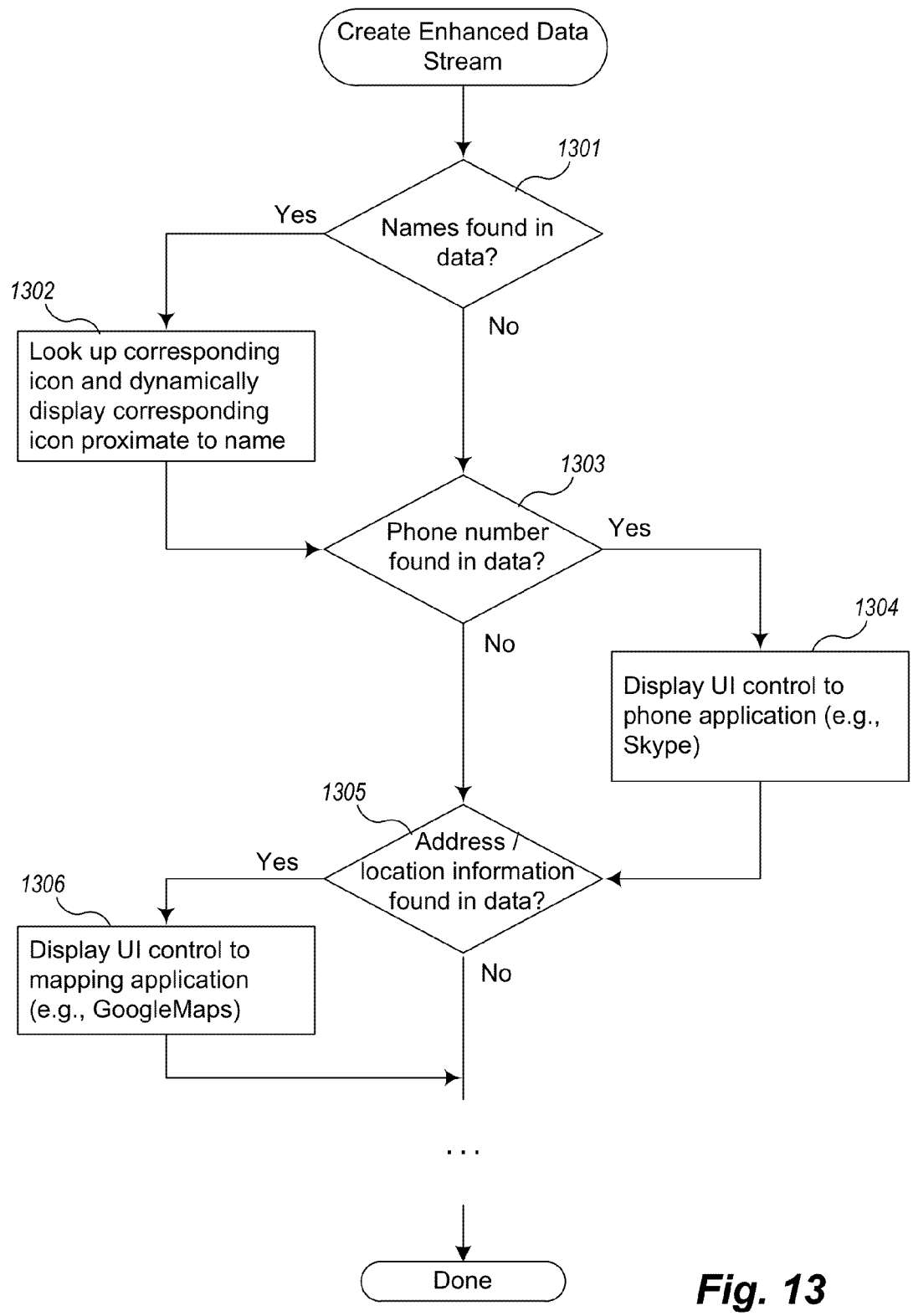
FIG. 13 is an example flow diagram of logic for further processing of context information received from an example legacy application task.

FIG. 13 is an example flow diagram of logic for creating an enhanced data stream from output received from an example legacy application task. This logic corresponds to more detail executed as a result of the filtering process of block 1204 in FIG. 12. It is one example of many of the functions that can be performed as a result of filtering the data received. In one embodiment, this logic is provided by a rules engine that is created as a result of configuring the RBMS.

In block 1301, the logic determines whether names are found in the data and, if so, proceeds to block 1302, otherwise continues in block 1303. In block 1302, the logic looks up in a storage repository or creates a corresponding icon and dynamically displays each corresponding icon in a position close to the corresponding name in the enhanced output. In block 1303, the logic determines whether phone numbers are found in the data and, if so, proceeds to block 1304, otherwise continues in block 1305. In block 1304 the logic displays a UI control to a phone application nearby each phone number in the enhanced output. In block 1305, the logic determines whether addresses are found in the data, and, if so, proceeds to block 1306, otherwise continues to process other objects it is looking for in a similar manner until all of the legacy task output has been filtered and enhanced where indicated. In block 1306, the logic displays a control to a mapping application nearby each address in the enhanced output, and continues to process other objects.

Figure 14:
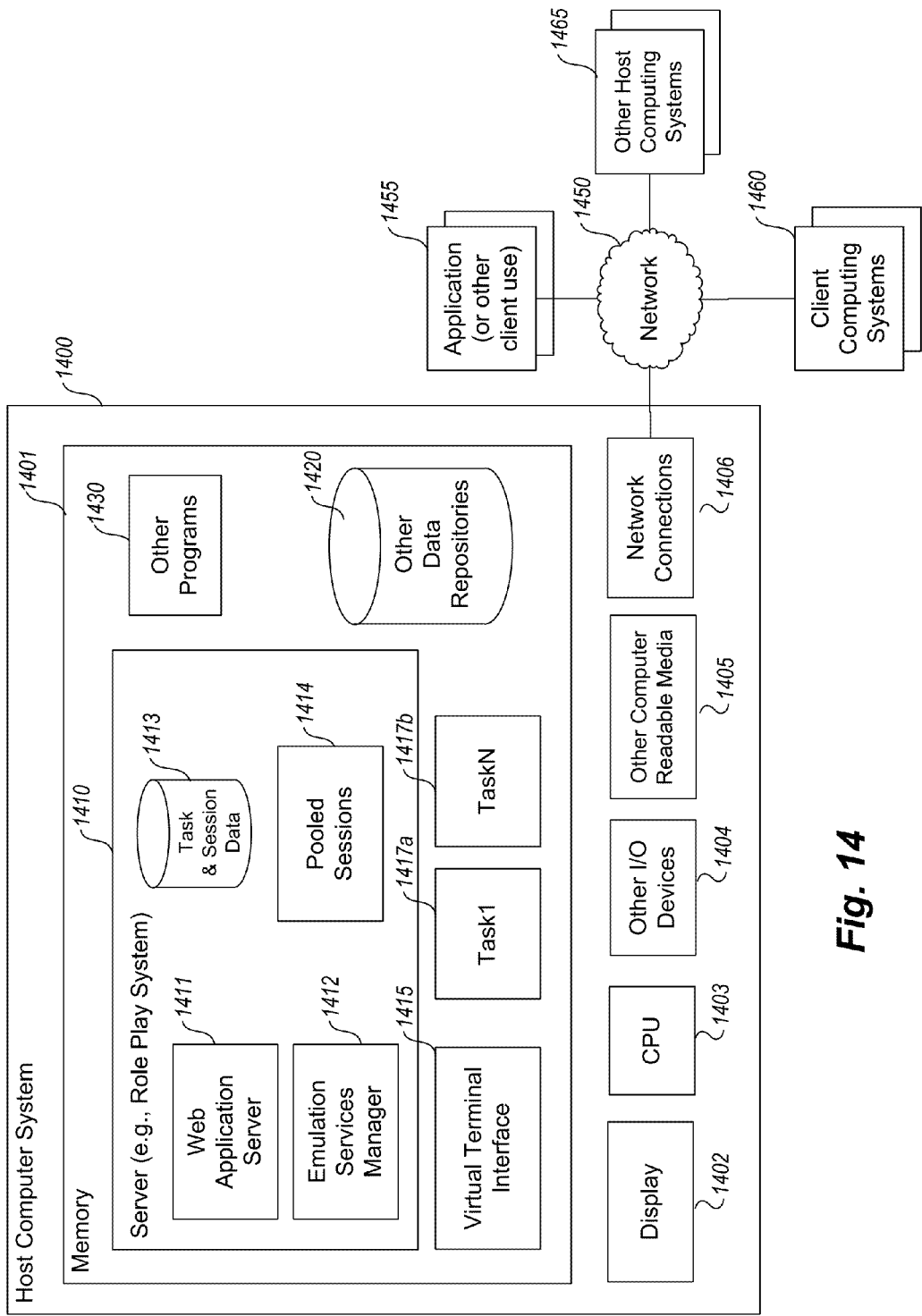
FIG. 14 is an example block diagram of a computing system for practicing embodiments of a server computing system of a Role-Based Modernization System.

FIG. 14 is an example block diagram of a computing system for practicing embodiments of a server computing system of a Role-Based Modernization System. Note that a general purpose or a special purpose computing system suitably instructed may be used to implement an RBMS. Further, the RBMS may be implemented in software, hardware, firmware, or in some combination to achieve the capabilities described herein.

The computing system 1400 may comprise one or more computing systems and may span distributed locations. In addition, each block shown may represent one or more such blocks as appropriate to a specific embodiment or may be combined with other blocks. Moreover, the various blocks of the Role-Based Modernization System 1410 may physically reside on one or more machines, which use standard (e.g., TCP/IP) or proprietary interprocess communication mechanisms to communicate with each other.

In the embodiment shown, computer system 1400 comprises a computer memory ("memory") 1401, a display 1402, one or more Central Processing Units ("CPU") 1403, Input/Output devices 1404 (e.g., keyboard, mouse, CRT or LCD display, etc.), other computer-readable media 1405, and one or more network connections 1406. The RBMS 1410 is shown residing in memory 1401. In other embodiments, some portion of the contents, some of, or all of the components of the RBMS 1410 may be stored on and/or transmitted over the other computer-readable media 1405. The components of the Role-Based Modernization System 1410 preferably execute on one or more CPUs 1403 and manage the invocation and input/output to and from legacy tasks as described herein. Other code or programs 1430 and potentially other data repositories, such as data repository 1420, also reside in the memory 1401, and preferably execute on one or more CPUs 1403. In addition, a Virtual Terminal Interface 1415 to the host operating system, and one or more tasks, for example 1417a and 1417b may be currently executing on the one or more CPUs 1403 and stored in the memory 1401. Of note, one or more of the components in FIG. 14 may not be present in any specific implementation. For example, in various embodiments certain components, such as the display 1402 and/or certain input/output devices 1404 (such as a keyboard or mouse) may not be present.

In at least one typical embodiment, the RBMS 1410 includes one or more Web Application Servers 1411, an Emulation Services Manager (ESM) 1412, pooled sessions Y14, and task and session data repository 1413. In at least some embodiments, the data repository 1413 is provided external to the RBMS and is available, potentially, over one or more networks 1450. Other and/or different modules may be implemented. In addition, the RBMS may interact via a network 1450 with application or other client code 1455, one or more other host computing systems 1465, for example, running remote legacy tasks, and/or one or more client computing systems 1460 such as the client system demonstrated in FIG. 10. Also, the task and session data repository 1413 may be provided external to the RBMS as well, for example in a knowledge base accessible over one or more networks 1450.

As discussed with reference to the RBMS of FIG. 14, the RBMS 1410 may similarly be implemented in various ways and/or using various known or proprietary techniques. In particular, the RBMS 1410 may be implemented in hardware, software, and/or firmware. Software portions of the RBMS 1410 may be implemented using one or more programming languages and associated tools (e.g., compilers, interpreters, linkers, etc.) to generate code portions (e.g., instruction sequences) that may be processed by hardware components (e.g., a CPU) and/or software components (e.g., a virtual machine). In addition, the RBMS 1410 may be decomposed, if at all, using various techniques, including client-server architectures, N-tier architectures, Web Services (e.g., SOAP), classes, libraries, archives, etc.

Figure 15:
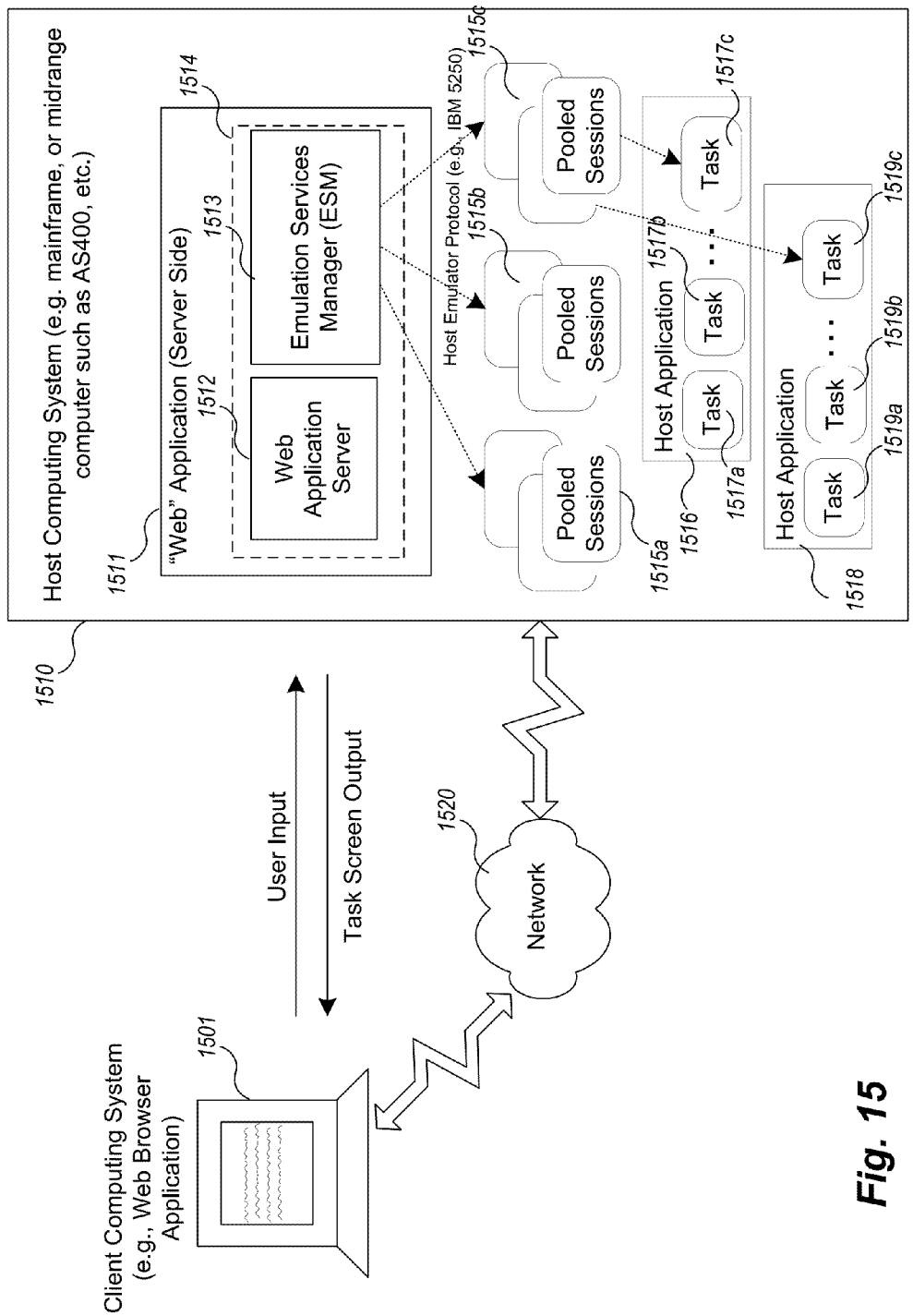
FIG. 15 is an example block diagram of server-side components of an example Role-Based Modernization System using session pooling techniques.

FIG. 15 is an example block diagram of server-side components of an example Role-Based Modernization System that includes session pooling techniques. As described with respect to FIG. 8 and elsewhere in the present Figures, the client-side of the RBMS, here shown as client 1501, communicates over one or more networks 1520 with one or more host computing systems, e.g., system 1510, to run role-modernized legacy tasks. In example embodiments, the host computing system 1510 comprises a Web Application 1511, which comprises Web Application Server 1512 and Emulation Services Manager (ESM) 1513. As explained elsewhere, the Web Application Server 1512 may comprise an SOA server configured to respond to messages from the client 1501. The host computing system 1510 also comprises a set of host (legacy) applications 1516 and 1518, which in turn each comprise one or more tasks, for example, tasks 1517a-1517c and tasks 1519a-1519c.

In one embodiment of the RBMS (there are other server side ways to support role-modernization for RBMS clients), the server employs a technique referred to as "session pooling" to multiplex between several running tasks to enable the correct output to be returned to the RBMS client in response to client requests to communicate with a particular task. In brief, a pool of host sessions, for example pooled sessions 1515a-1515c are created (potentially in advance or as needed) for each user and allocated as needed to tasks invoked by that user. Each session keeps track of its own state, as sessions typically do. This state is "persistent," even when the client is not actively working with the corresponding legacy task, because the session that corresponds to the running task is not terminated each time the user switches to working with another legacy task (maintained in a different session). Accordingly, the ESM, instead of the user, is responsible for keeping track of all of the running sessions and stores data as needed, for example in data repository 833 of FIG. 8. As described further below with respect to FIGS. 17A-17B, when a client request for a legacy task comes in, typically in the form of a task identifier and various input parameters, the Emulation Services Manager (ESM) 1514 finds the corresponding task, and if it is already executing, switches to providing output from the corresponding session from a session pool, otherwise allocates a new session and starts up the corresponding task from an appropriate session pool. In this manner the ESM multiplexes between the various running legacy tasks and provides the correct output screens to the client RBMS 1501 without starting and stopping other sessions to do so. In typical of these embodiments the ESM 1513 communicates with the operating system of the host computing system 1510 using its virtual terminal services through an applications programming interface (API). In the example illustrated, the ESM 1513 communicates with the host environment using standard 5260/3270 protocol to manage its sessions and communicate with the legacy applications/tasks.

Of note, the pooling session techniques handling legacy task/application management described herein may be used for purposes other than for responding to a role-based modernization system.

Figure 16:
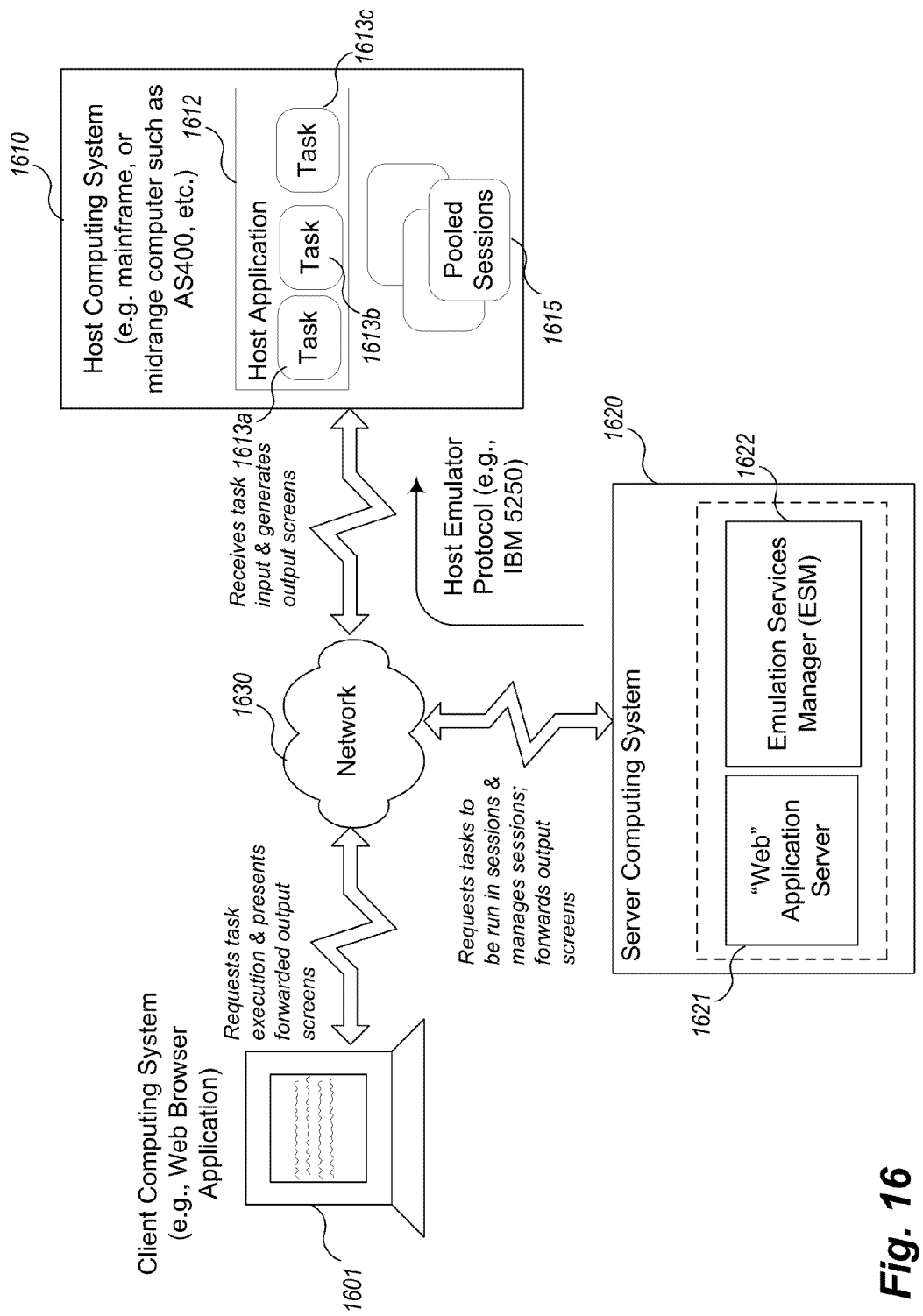
FIG. 16 is an example block diagram of an alternative layout of server-side components of an example Role-Based Modernization System using session

FIG. 16 is an example block diagram of an alternative layout of server-side components of an example Roles Based Modernization System using session pooling techniques. In this embodiment, the server-side portion of the RBMS resides in a server computing system 1620 separate from the host computing system 1610 where the applications 1612 having legacy tasks 1613a-1613c reside. The server computing system 1620 comprises the Web Application (e.g., SOA) server 1621 and the Emulation Services Manager 1622. Because the ESM 1622 is separated from the host computing system 1610, it needs to communicate over the network 1630 using Telnet or other protocol wrapping around the emulator protocol.

Of note, the architecture of FIG. 15 has an advantage that a single binary for the Web Application 1511 can be installed on the host computing system that the user already has without a need to configure additional machines. Also, in some situations it is possible that the client-side RBMS invokes tasks that are executing or to be executed at a variety of locations, potentially even geographically remote. In such a situation, according to one embodiment, the ESM 1513 can be distributed and manage the ESMs on the other host computing environments in a master-slave type of I/O relationship. This provides a degree of location transparency to the client computing system, since the client need only communicate with a single ESM.

Figure 17A:
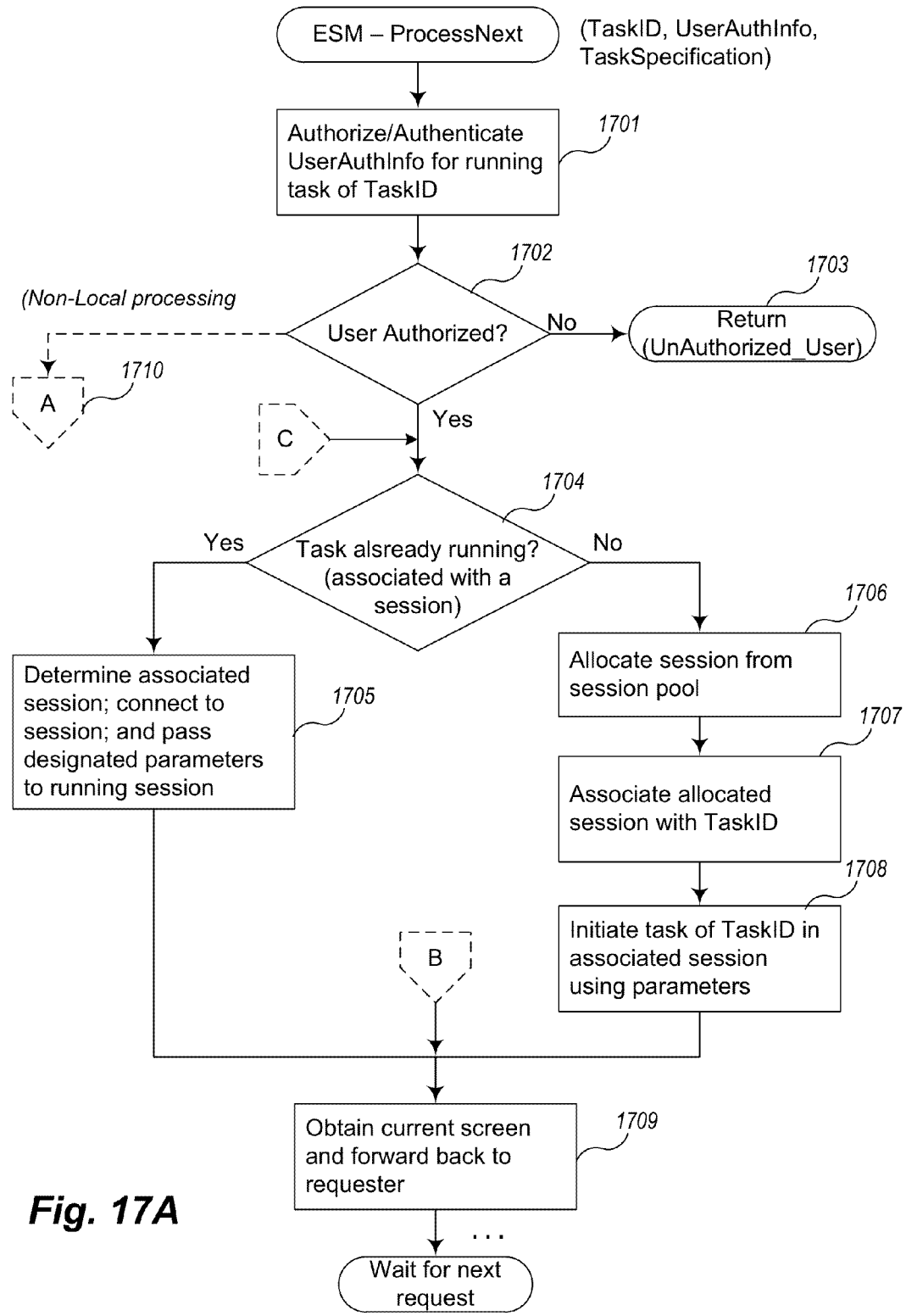
FIGS. 17A-17B are example flow diagrams of logic of an example Emulation Services Manager of a Role-Based Modernization System according to session pooling techniques.
Figure 17B:
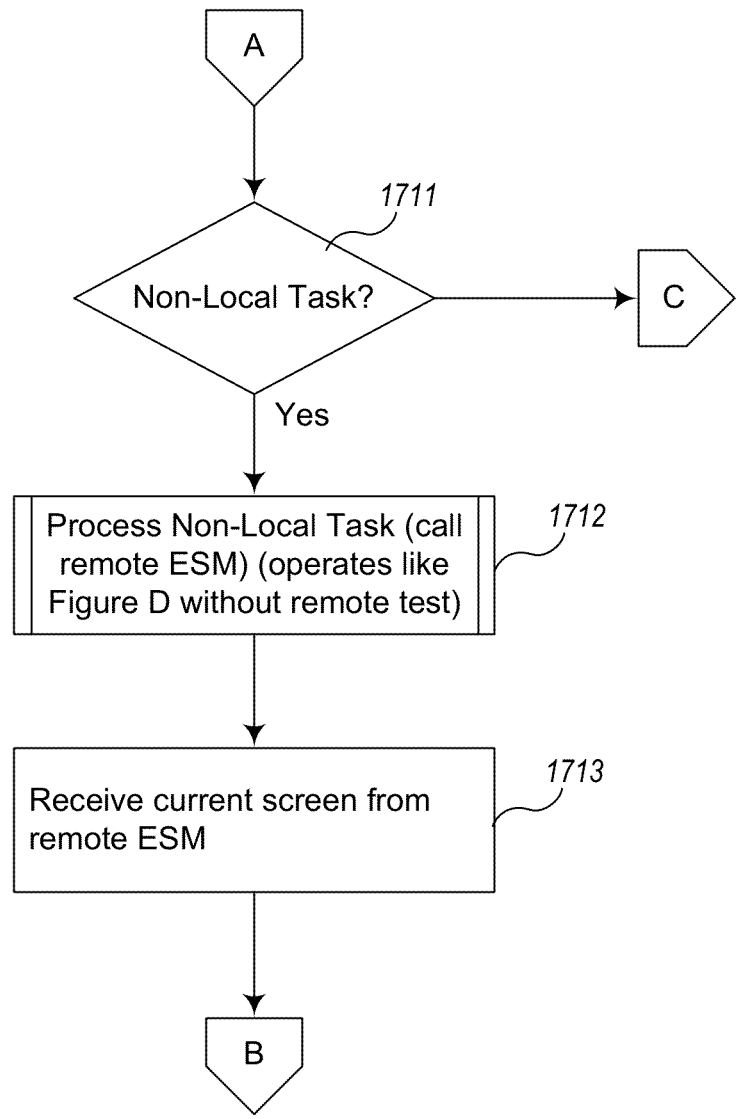

FIGS. 17A-17B are example flow diagrams of logic of an example Emulation Services Manager of a Role-Based Modernization System according to session pooling techniques. As mentioned with respect to FIG. 15, the Emulation Services Manager (ESM) may be co-resident with the host applications or on a remote computing system. In block 1701, the ESM authorizes and authenticates user information forwarded by the client RBMS for the requested task. This action protects against masquerading and other types of malicious computing behaviors.

In block 1702, the ESM determines if the user is authorized, and, if not returns a status to the client-side host interface that an unauthorized user was detected. If authorized, the ESM continues in block 1704 to determine whether the requested legacy task is already running (in a session) and, if so, continues with block 1705; otherwise, continues with block 1706. Since the ESM maintains and manages its pools of sessions, it stores appropriate information to be able to make this determination.

In the case where the legacy task is already running, then in block 1705 the ESM determines (for example, by table lookup, database query, etc.) which session corresponds to the designated task, connects to the session, and passes any designated parameters to the running session. The ESM then continues in block 1709.

In the case where the legacy task is not yet running, then in block 1706 the ESM allocates and starts a new session from the session pool. In block 1707, the ESM associates the new session with the task identifier, and in block 1708 initiates the task that corresponds to the designated task identifier using any designated parameters. The ESM then continues in block 1709.

In block 1709, the ESM obtains the current screen (after running any designated input) and forwards the current screen to the client-side requester, which in the DBMS is the client-side host interface of the RBMS. The ESM then does any other activities, and waits for the next request. Although the ESM logic is shown to execute synchronously, in some embodiments it uses asynchronous calling mechanisms to determine when a request is to be processed.

In some embodiments, as mentioned with respect to FIGS. 15 and 16, a client application optionally may request execution of legacy tasks that are on remote computing systems. In such a case, additional logic instructions are added to divert to block 1711 after authorizing the user in block 1702. In block 1711, the ESM determines whether the requested task is a non-local task and, if so, continues in block 1712, otherwise progresses to block 1704.

In block 1712, the ESM processes the non-local task request by forwarding the request to the remote ESM. The remote ESM then processes the request using similar logic to FIG. 17A, typically without the non-local task test branch (blocks 1711-1713). In block 1713, the ESM receives a resultant output screen (data stream from the requested task) from the remote ESM and continues with block 1709 to forward the data stream to the requestor.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/280,034, entitled "ROLE-BASED MODERNIZATION OF LEGACY APPLICATIONS," filed Oct. 28, 2009; U.S. Provisional Patent Application No. 61/280,044, entitled "SESSION POOLING FOR LEGACY APPLICATION TASKS," filed Oct. 28, 2009; U.S. Provisional Patent Application No. 61/280,040, entitled "MODERNIZATION OF LEGACY APPLICATIONS USING DYNAMIC ICONS," filed Oct. 28, 2009; U.S. Provisional Patent Application No. 61/280,060, entitled "DYNAMIC EXTENSIONS TO LEGACY APPLICATION TASKS," filed Oct. 28, 2009; U.S. Provisional Patent Application No. 61/280,042, entitled "HOTKEY ACCESS TO LEGACY APPLICATION TASKS," filed Oct. 28, 2009; U.S. Provisional Patent Application No. 61/280,041, entitled "TIERED CONFIGURATION OF LEGACY APPLICATION TASKS," filed Oct. 28, 2009; and U.S. Provisional Patent Application No. 61/280,043, entitled "MANAGEMENT OF MULTIPLE INSTANCES OF LEGACY APPLICATION TASKS," filed Oct. 28, 2009; are incorporated herein by reference, in their entireties.

From the foregoing it will be appreciated that, although specific embodiments have been described herein for purposes of illustration, various modifications may be made without deviating from the spirit and scope of the present disclosure. For example, the methods and systems for performing role-based modernization discussed herein are applicable to other architectures other than a windowing architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.)

The invention claimed is:

1. A method in a computer system for modernizing an existing menu-based legacy application, comprising:
by a client application executing within a Web browser executed by the computer system,
receiving an indication of a user defined key sequence;
associating the user defined key sequence with an executing task of the existing menu-based legacy application executing on a host system; and
facilitating access to the executing task by displaying screen output of the executing task whenever the associated user defined key sequence is entered,
wherein the computer system is a client computing system that interacts with a remote computer system that hosts the existing menu-based legacy application, wherein the menu-based legacy application presents screen output via a series of hierarchical menus, each menu represented as a character stream for presentation line-by-line on a distinct terminal screen without pixel addressing, the distinct terminal screen being one of a plurality of distinct terminal screens, and wherein facilitating access to the executing task includes displaying the screen output of the executing task in one user action of entering the defined key sequence instead of by navigating the series of hierarchical menus displayed line-by-line on the plurality of distinct terminal screens,
wherein the remote computer system includes a Web application that includes a Web application server and an emulation services manager that is configured to:
receive a client request for the existing menu-based legacy application, the request including a task identifier and input parameters;

find a task corresponding to the client request;
if the task is already executing, switch to providing output from a corresponding session from a session pool, otherwise allocate a new session from the session pool and start up the corresponding task; and
interface via an emulation protocol with the existing menu-based legacy application.

2. The method of claim 1, further comprising:
associating a set of default key sequences each associated with an other display screen; and
displaying the associated other display screen whenever one of the set of default key sequences is entered.

3. The method of claim 2 wherein at least one of the set of default key sequences is configured to cause a workspace associated with a role to be displayed.

4. The method of claim 3 wherein facilitating access to the executing task includes causing the workspace associated with the role to be displayed.

5. The method of claim 4 wherein causing the workplace associated with the role to be displayed includes displaying a home task workspace that is associated with a client role.

6. The method of claim 1 wherein the key sequence is a combination of one or more of the ALT, TAB, SHIFT, or CTRL keys in conjunction with an alphanumeric key.

7. A non-transitory computer-readable medium whose contents enable a computing system to modernize an existing menu-based legacy application, by performing a method comprising:
by a client application executing within a Web browser executed by the computer system,
receiving an indication of a user defined key sequence;
associating the user defined key sequence with an executing task of the existing menu-based legacy application executing on a host system; and
facilitating access to the executing task by displaying screen output of the executing task whenever the associated user defined key sequence is entered,
wherein the computer system is a client computing system that interacts with a remote computer system that hosts the existing menu-based legacy application, wherein the menu-based legacy application presents screen output via a series of hierarchical menus, each menu represented as a character stream for presentation line-by-line on a distinct terminal screen without pixel addressing, the distinct terminal screen being one of a plurality of distinct terminal screens, and wherein facilitating access to the executing task includes displaying the screen output of the executing task in one user action of entering the defined key sequence instead of by navigating the series of hierarchical menus displayed line-by-line on the plurality of distinct terminal screens,
Wherein the remote computer system includes a Web application that includes a Web application server and an emulation services manager that is configured to:
receive a client request for the existing menu-based legacy application, the request including a task identifier and input parameters;
if the task is already executing, switch to providing output from a corresponding session from a session pool, otherwise allocate a new session from the session pool and start up the corresponding task; and
interface via an emulation protocol with the exiting menu-based legacy application.

8. The non-transitory computer-readable medium of claim 7, wherein the method further comprises: associating a set of default key sequences each associated with an other display screen; and displaying the associated other display screen whenever one of the set of default key sequences is entered.

9. The non-transitory computer-readable medium of claim 8 wherein at least one of the set of default key sequences is configured to cause a workspace associated with a role to be displayed.

10. The non-transitory computer-readable medium of claim 9 wherein facilitating access to the executing task includes causing the workspace associated with the role to be displayed.

11. The non-transitory computer-readable medium of claim 10 wherein causing the workplace associated with the role to be displayed includes displaying a home task workspace that is associated with a client role.

12. The non-transitory computer-readable medium of claim 7 wherein the key sequence is a combination of one or more of the ALT, TAB, SHIFT, or CTRL keys in conjunction with an alphanumeric key.

13. The non-transitory computer-readable medium of claim 7 wherein the computer-readable medium is a memory of the computing system, and wherein the contents are instructions that are stored on the memory and that are configured to cause the computing system to perform the method.

14. A computer system configured to modernize an existing menu-based legacy application, comprising:
a memory; and
a module that is stored on the memory and that is configured, when executed by a client application executing within a Web browser executed by the computer system, to:
receive an indication of a user defined key sequence;
associate the user defined key sequence with an executing task of the existing menu-based legacy application executing on a host system; and
facilitate access to the executing task by displaying screen output of the executing task whenever the associated user defined key sequence is entered,
wherein the computer system is a client computing system that interacts with a remote computer system that hosts the existing menu-based legacy application, wherein the menu-based legacy application presents screen output via a series of hierarchical menus, each menu represented as a character stream for presentation line-by-line on a distinct terminal screen without pixel addressing, the distinct terminal screen being one of a plurality of distinct terminal screens, and wherein the module is further configured to facilitate access to the executing task by displaying the screen output of the executing task in one user action of entering the defined key sequence instead of by navigating the series of hierarchical menus displayed line-by-line on the plurality of distinct terminal screens,
wherein the remote computer system includes a Web application that includes a Web application server and an emulation services manager that is configured to:
receive a client request for the existing menu-based legacy application, the request including task identifier and input parameters;
find a task corresponding to the client request;
if the task is already executing, switch to providing output from a corresponding session from a session pool, otherwise allocate a new session from the session pool and start up the corresponding task, and
interface via an emulation protocol with the existing menu-based legacy application.

15. The computer system of claim 14 wherein the module includes instructions for execution in the memory of the computer system.

16. The computer system of claim 14 wherein the module is further configured to:
   associate a set of default key sequences each associated with an other display screen; and
   display the associated other display screen whenever one of the set of default key sequences is entered.

17. The computer system of claim 14 wherein the module is further configured to:
   request user selection of the user defined key sequence; and
   present user interface controls configured for specifying the user defined key sequence.

18. The method of claim 1 wherein the series of hierarchical menus includes at least ten menus that each correspond to a separately executable task.

19. The non-transitory computer-readable medium of claim 7 wherein the series of hierarchical menus includes at least ten menus that each correspond to a separately executable task.

* * * * *